United States Patent [19]

Song

[11] Patent Number: 6,101,190
[45] Date of Patent: Aug. 8, 2000

[54] SWITCHING SYSTEM AND METHOD FOR ASYNCHRONOUS TRANSFER MODE EXCHANGE FOR MULTIMEDIA SERVICE

[75] Inventor: Doug-Young Song, Seongnam, Rep. of Korea

[73] Assignee: SamSung Electronics Co., Ltd., Suwon, Rep. of Korea

[21] Appl. No.: 08/774,176

[22] Filed: Dec. 26, 1996

[30] Foreign Application Priority Data

Dec. 26, 1995 [KR] Rep. of Korea ...................... 95-56581

[51] Int. Cl.[7] .................................................. H04L 12/28
[52] U.S. Cl. ............................................ 370/411; 370/414
[58] Field of Search ................................... 370/901–905, 370/427, 370, 380, 381, 411, 386, 395, 413, 414

[56] References Cited

U.S. PATENT DOCUMENTS

| | | | |
|---|---|---|---|
| 4,833,468 | 5/1989 | Larson et al. ........................... | 370/386 |
| 4,956,839 | 9/1990 | Torii et al. ............................. | 370/232 |
| 5,121,384 | 6/1992 | Ozaki et al. ............................ | 370/400 |
| 5,130,976 | 7/1992 | Hickey et al. .......................... | 370/396 |
| 5,202,885 | 4/1993 | Schrodi et al. ......................... | 370/355 |
| 5,214,642 | 5/1993 | Kunimoto et al. ...................... | 370/471 |
| 5,258,752 | 11/1993 | Fukaya et al. .......................... | 370/398 |
| 5,258,977 | 11/1993 | Wolker et al. .......................... | 370/395 |
| 5,280,475 | 1/1994 | Yanagi et al. .......................... | 370/399 |
| 5,280,483 | 1/1994 | Kamoi et al. ........................... | 370/234 |
| 5,319,639 | 6/1994 | Guha ....................................... | 370/427 |
| 5,339,310 | 8/1994 | Taniguchi ............................... | 370/397 |
| 5,410,540 | 4/1995 | Aiki et al. ............................... | 370/390 |
| 5,455,820 | 10/1995 | Yamada ................................... | 370/413 |
| 5,483,525 | 1/1996 | Song ....................................... | 370/392 |
| 5,519,689 | 5/1996 | Kim ........................................ | 370/232 |
| 5,533,021 | 7/1996 | Branstad et al. ........................ | 370/396 |
| 5,537,402 | 7/1996 | Notani et al. ........................... | 370/395 |
| 5,555,378 | 9/1996 | Gelman et al. ..................... | 395/200.65 |
| 5,557,609 | 9/1996 | Shobatake et al. ..................... | 370/395 |
| 5,687,172 | 11/1997 | Cloonan ................................. | 370/905 |
| 5,724,351 | 3/1998 | Hung-Hsiang et al. ................ | 370/905 |
| 5,724,358 | 3/1998 | Headrick et al. ....................... | 370/905 |

OTHER PUBLICATIONS

ATM Technology for Corporate Networks, (Corporate ATM networks will enable simpler network solutions and stimulate the development of new communication applications.) by Peter Newman, IEEE Communications Magazine Apr., 1992 pp. 90–101. Identifying num.

*Primary Examiner*—Chau Nguyen
*Assistant Examiner*—Frederic D. Wolkow
*Attorney, Agent, or Firm*—Robert E. Bushnell, Esq.

[57] ABSTRACT

A switch network and method of an asynchronous transfer mode switch network, includes an input buffer; an input switch network performing fetch and add function; a copy switch network performing fetch and add function; a feedback switch network receiving cells feedback and maintaining them until the next cell cycle; a routing table for storing data for translation and replacement of data for the cells' routing; a routing/feedback controller routing-controlling the input cells and fedback cells with reference to the routing table; routing switch networks switching-outputting the cells input; a cell splitter splitting the cells routing-output into the number of the routing networks and transferring them to the routing switch networks, and a cell merger merging and outputting the cells split and output from the output ports of the routing switch networks

19 Claims, 39 Drawing Sheets

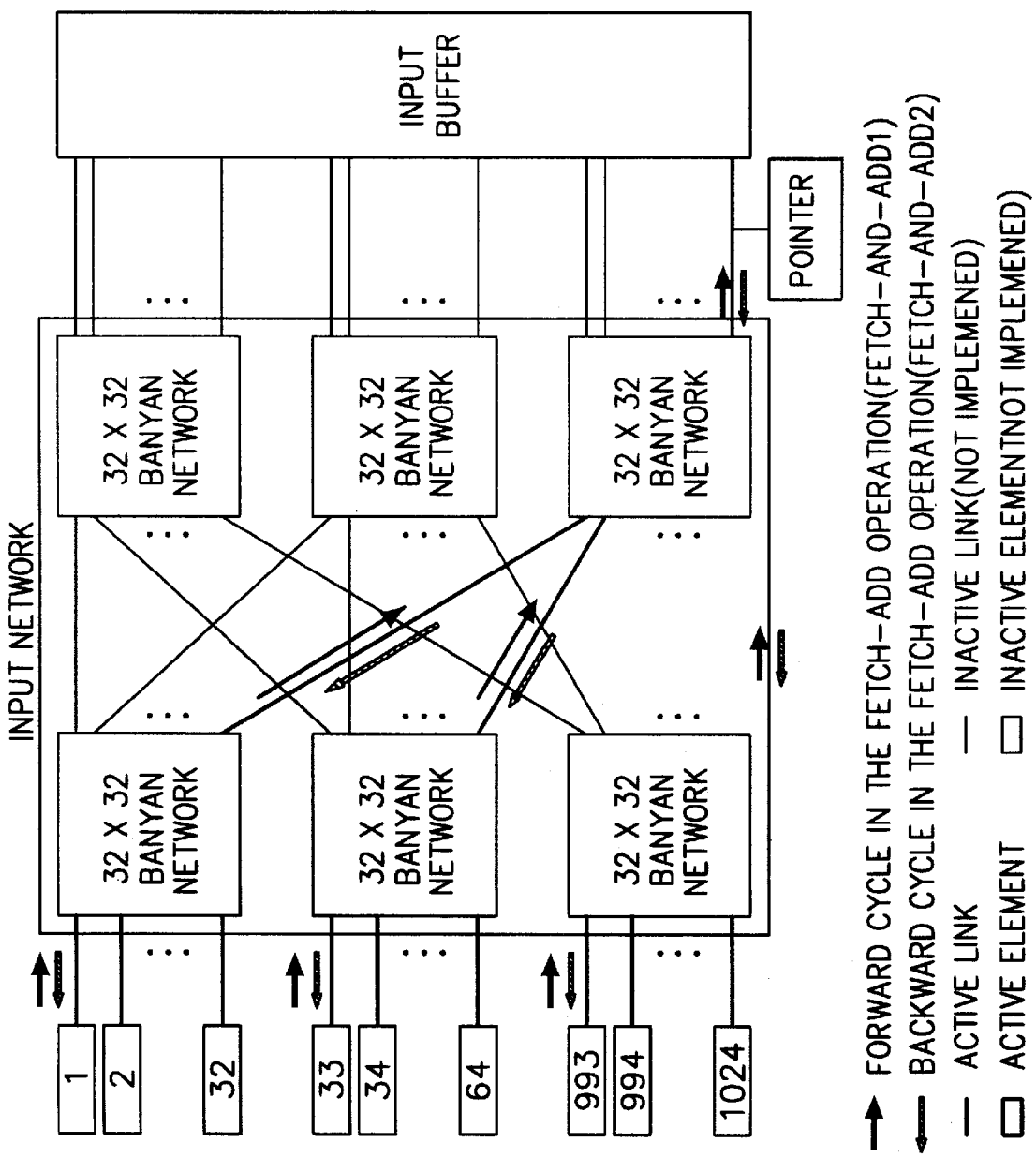

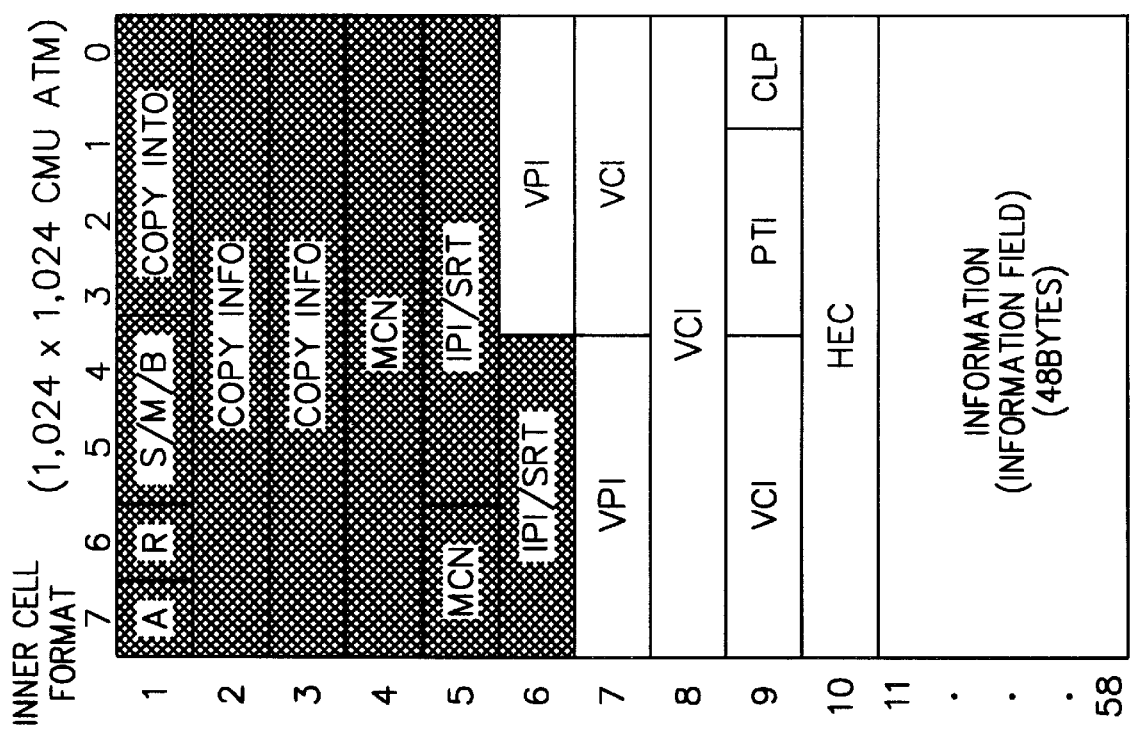

FIG. 24B

SWITCHING SYSTEM AND METHOD FOR ASYNCHRONOUS TRANSFER MODE EXCHANGE FOR MULTIMEDIA SERVICE

CLAIM FOR PRIORITY UNDER 35 U.S.C. §119

This application makes reference to, incorporates the same herein, and claims all benefits accruing under 35 U.S.C. §119 from an application for Switching System And Method For Asynchronous Transfer Mode Exchange earlier filed in the Korean Industrial Property Office on Dec. 26, 1995, and there duly assigned Ser. No. 56581/1995.

BACKGROUND OF THE INVENTION

1. Technical Field

The present invention relates to a switching system and method for an asynchronous transfer mode, and more particularly relates to a switching system and method for an asynchronous transfer mode for multimedia service.

2. Background Art

Generally, multimedia communications involve the blending together of computer data processing, audio/video, and display technology in an interactive environment. Multimedia service concerns a variety of traffic characteristics (data rate, burstiness or the like), and service qualities (transfer delay, transfer delay variance, data loss or the like). In addition, its service format requires point-to-point, point-to-multipoint, and multipoint-to-multipoint configurations. In one type of services, there could be single connection and multi-connection. Traditional switching networks such as a public switched telephone network (PSTN) and a packet switched public data network (PSPDN) are not capable of providing multimedia services because they are designed for a specific service of a predetermined format. Therefore, for multimedia services, a switching network of a new format is required, and developments in various services, from terminals to switching/transfer system, forming such a new switching network are necessary. Presently, the most suitable transmission and switching technique which implements multimedia communication combining high quality voice, video, and high speed data traffic is known as Asynchronous Transfer Mode (ATM), an internationally agreed technique adopted by the International Telecommunication Union (ITU) for purposes of standardization of ATM communication networks.

Generally, an ATM switching network decomposes multimedia communication data into fixed length blocks having a predetermined bit size, no matter whether the communication data is voice, image, data or the like. The block is referred to as a cell. The cell includes a header portion and a data portion. In the header portion, destination identifing information or the like is stored. By using this destination identifying information, every information is transmitted and switched in a multiplexed manner at high speed on a cell basis. Conventionally, there are a variety of ATM switching networks. Exemplary configurations are disclosed, for example, in U.S. Pat. No. 4,956,839 for ATM Switching System issued to Torii, U.S. Pat. No. 5,214,642 for ATM Switching System And Adaption Processing Apparatzis issued to Kunimoto, U.S. Pat. No. 5,202,885 for ATM Exchange With Copying Capability issued to Schrodi et al., U.S. Pat. No. 5,258,977 for Switching Network For An Asynchronous Time Division Multiplex Transmission System issued to Wolker et al., U.S. Pat. No. 5,339,310 for Switching Apparatus For Switched Network of Asynchronous Transfer Mode issued to Taniguchi, U.S. Pat. No. 5,410,540 for Shared-Buffer-Type ATM Switch Having Copy Function And Copy Method Thereof issued to Aiki, U.S. Pat. No. 5,455,820 for Output-Buffer Switch For Asynchronous Transfer Mode issued to Yamada, U.S. Pat. No. 5,537,402 for ATM Switch issued to Notani et al., U.S. Pat. No. 5,555,378 for Scheduling Transmission Multimedia Information In Broadhand Networks Using A Token Passing scheme issued to Gelman et al., U.S. Pat. No. 5,557,609 for Switching Apparatus for ATM issued to Shobatake et al. For example, for purposes of dividing information transfer channel, there are time division and space division ATM switching networks. For topology, there are ring type, bus type and lattice type ATM switching networks. In addition, depending on the location of a buffer used, there are a number of ATM switches in the network including an input buffer, common buffer, dispersed buffer, and output buffer. Each ATM switch is referred to as a unit switch.

The space-division ATM switching network basically has a lattice form like a Banyan network or a cross-bar network, and a self-routing in which cells inside the switch network search for their own destination (switch network's output ports) according to its hardware architecture. However, this structure must contain a buffer because most of unit switches involve internal blocking. All ATM switching networks including space division and time division types must also include an output buffer on their respective output sides because of output port collision.

The input buffer included in the space-division ATM switching network can be classified as either a dedicated buffer or a shared buffer, although the dedicated buffer is normally used. Dispersed buffer types are advantageous because of their easy operation. However, they are disadvantageous in that the buffer used for the respective ports of the switch network is fixed and thus the traffic (cells) is not scattered to the switch network ports on the whole. As a result, if the cells are maldistributed, the overflow of input data can occur at any port.

In the ATM switching network, the internal path between an input port and output port can be a single path or multiple paths. In case of single path, internal blocking frequently occurs and this may decrease its performance due to cell loss. In spite of the internal blocking, however, the single-path ATM switching network has a simple internal routing and is easy to operate. In case of the multiple-path switch network, the probability of internal blocking is small but the control of routing for the multiple paths is too complicated to be applied to a large volume of switches. This is because the control speed of the switching network for routing does not reach the cell transfer speed.

In a case that the multiple-path space-division ATM switching network is implemented with a shared buffer as its input buffer, the overflow of input data caused in the dispersed buffer type can be eliminated. However, in the ATM switching network whose transfer speed is hundreds of Mb/s, it is impossible to implement a large volume of switches despite of parallel transfer because its transfer speed is far faster than a memory operation speed. According to current semiconductor technology, the largest implementable size of the switching network is within 8*8 in case of eight-bit parallel data transfer.

As described above, the conventional ATM technique selects an easy-to-implement mode among time division/ space division, buffer usage, single path/multiple path in the ATM switching network. However, the conventional ATM switching network, as I have observed, has the following problems.

First, if the ATM switching network is time division, its capacity is so limited due to the limitation of commercially available memory access time. For instance, in an eight-bit parallel ATM switch network, the size of switch network manufactured is 4–8 ports.

Second, if the ATM switching network has multiple paths, the routing paths are multiple from the input port to the output port so that this should be analyzed for every call so as not to cause internal blocking in the switching network. However, this technique requires a very sophisticated control algorithm, and is therefore impossible for implementation as the size of switching network becomes larger.

Third, if the dedicated buffer is implemented as an input buffer allocated for every input port in the space-division input buffer switch network, the probability of overflow of buffer becomes larger according to the input traffic characteristics, causing service quality deterioration due to cell loss. In addition, the buffer utility efficiency is so low that the buffer cost increases in order to satisfy the performance as in the shared buffer mode.

SUMMARY OF THE INVENTION

Accordingly, it is therefore an object of the present invention to provide an improved ATM switching system.

It is also an object to provide an ATM switching network adapted for multimedia service with an enhanced switching speed.

It is another object of the present invention to provide a space-division ATM switching system and a process of enhancing the switching speed by using a shared input buffer and having a single path.

It is still another object of the present invention to provide an ATM switching system and a process of preventing internal blocking by implementing multiple routing networks.

It is yet another object of the present invention to provide an ATM switching system and a process of processing multimedia information by implementing a cell copy network.

It is another object of the present invention to provide an ATM switching system and a process of preventing output port contention by analyzing the path of cells output from the switching system and feeding them back.

It is a further object of the present invention to provide a pattern structure of cells switched in an asynchronous transfer mode switch system.

These and other objects of the present invention can be achieved by an asynchronous transfer mode switching system which includes: an input buffer for storing input cells; an input switch network made up with a predetermined size of reverse Banyan unit switches and having input ports and output ports connected to the input buffers, for performing fetch and add function in which the number of cell input is added in a direction from the input ports to the output ports and the input buffer's address is transferred in a direction from the output port to the input port according to the number of cell added, and for transferring and storing the input cells in the input buffer according to the result calculated from the fetch and add function; a copy switch network made up with a predetermined size of reverse Banyan unit switches and having input ports connected to the input buffer, for performing fetch and add function in which the number of cell copy is added in a direction from the input ports to the output ports and copy index corresponding to the number of cells copied is transferred in a direction from the output port to the input port, and for copying and transferring the cells output from the input buffer according to the result calculated from the fetch and add function; a feedback switch network made up with a predetermined size of unit switches and having input ports connected to the copy switch network, for receiving cells fedback and maintaining the feedback cells until the next cell cycle; a routing table for storing data for translation and replacement of data for the cells' routing, a routing/feedback controller for receiving the cells output from the copy switch network and cells fedback from the feedback switch network, routing-controlling the input cells and fedback cells with reference to the routing table, and feeding back cells collided at the output ports; routing switch networks in which a plurality of switch networks made up with a predetermined size of cross-bar unit switches are connected in parallel, for switching and outputting the cells input; a cell splitter connected to the input ports of the routing, switches, for splitting the cells routing-output into the number of the routing networks and transferring them to the routing switch networks; and a cell merger connected to the output ports of the routing switch networks, for merging and outputting the cells split and output from the output ports of the routing switch networks.

A method of implementing the asynchronous transfer mode switch network depends on how to operate various elements (modes) or which elements are used. In this invention, there is suggested a space-divided switch network having a shared input buffer and a single path. This invention is implemented in space division because time division has a fundamental problem of limited memory access time. In case of internal blocking in the single-path switch network, its performance is decreased. However, in this invention, the routing networks are provided in plurality in order to ensure 100% of its performance. In addition, the present invention uses a shared input buffer so that all the input ports share the buffer. Therefore, the input buffer's usage efficiency is 100%, and cell loss decreases even for the buffer of the same size as in the dispersed buffer. Accordingly, the present invention belongs to space division, lattice type, and input/output mixed buffer. In order to prevent internal blocking and output port contention, the present invention use buffers both for the input and output stages.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 9A illustrates the procedure of performing the fetch and add function at the input network of 1,024*1,024 volume;

FIG. 21 illustrates the structure of the cell header transferred in the ATM switching network according to the present invention;

FIG. 24B illustrates the procedure of preventing the output port contention in FIG. 24A;

DETAILED DESCRIPTION OF THE PREFERRED EMBODIMENT

Figure 1:
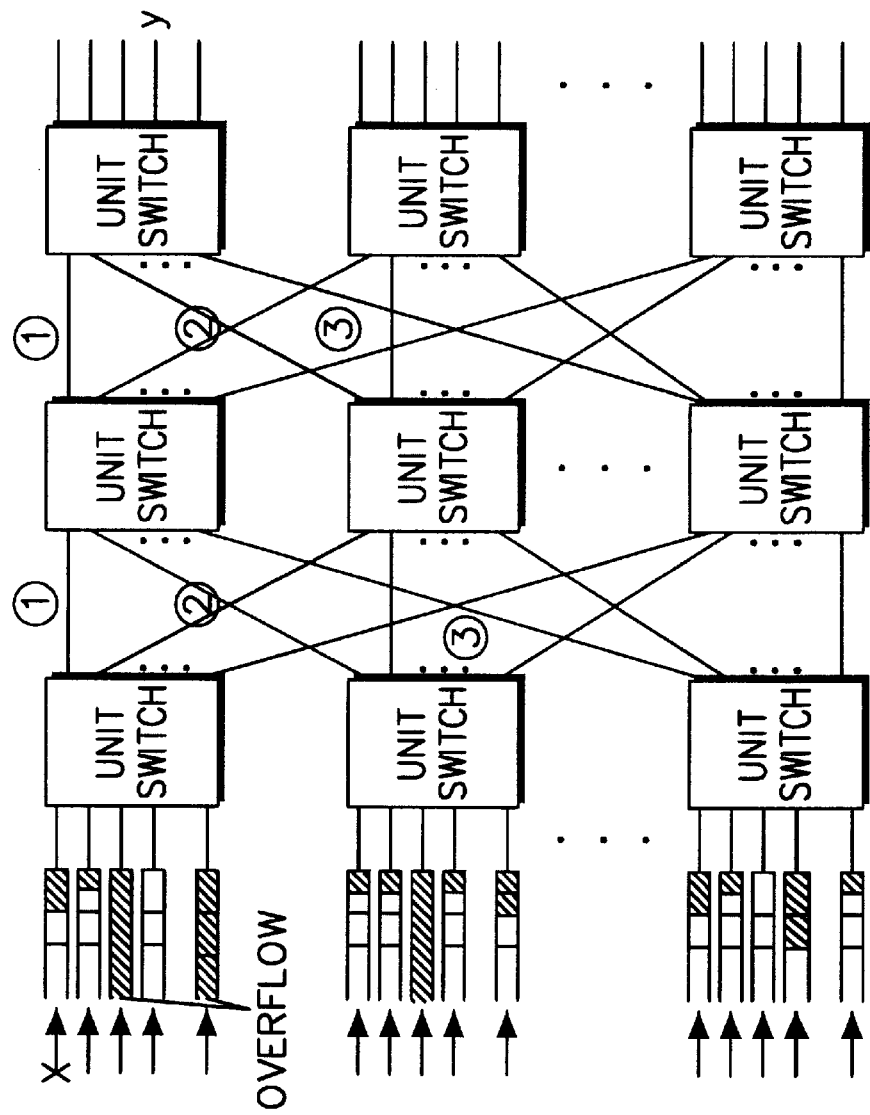
FIG. 1 illustrates the structure of a space-division multi-path switch network having buffers dedicated to its input ports.

Referring now to the drawings and particularly to FIG. 1, which illustrates a typical space-division ATM switching network in which a dedicated buffer is used as an input buffer. The dedicated buffer used for the respective input ports of the switching network is fixed and thus the traffic (cells) is not scattered to the switch network ports. If the cells are, however, maldistributed, the overflow of input data can occur at any port. In such an ATM switch network, the internal path between an input port and output port can be a single path or multiple paths. As shown in FIG. 1, the output path of unit switches between input port X and output port Y can be classified as (1), (2) and (3). Here, in case of a single path, internal blocking frequently occurs, and this may decrease its performance due to cell loss.

Figure 3:
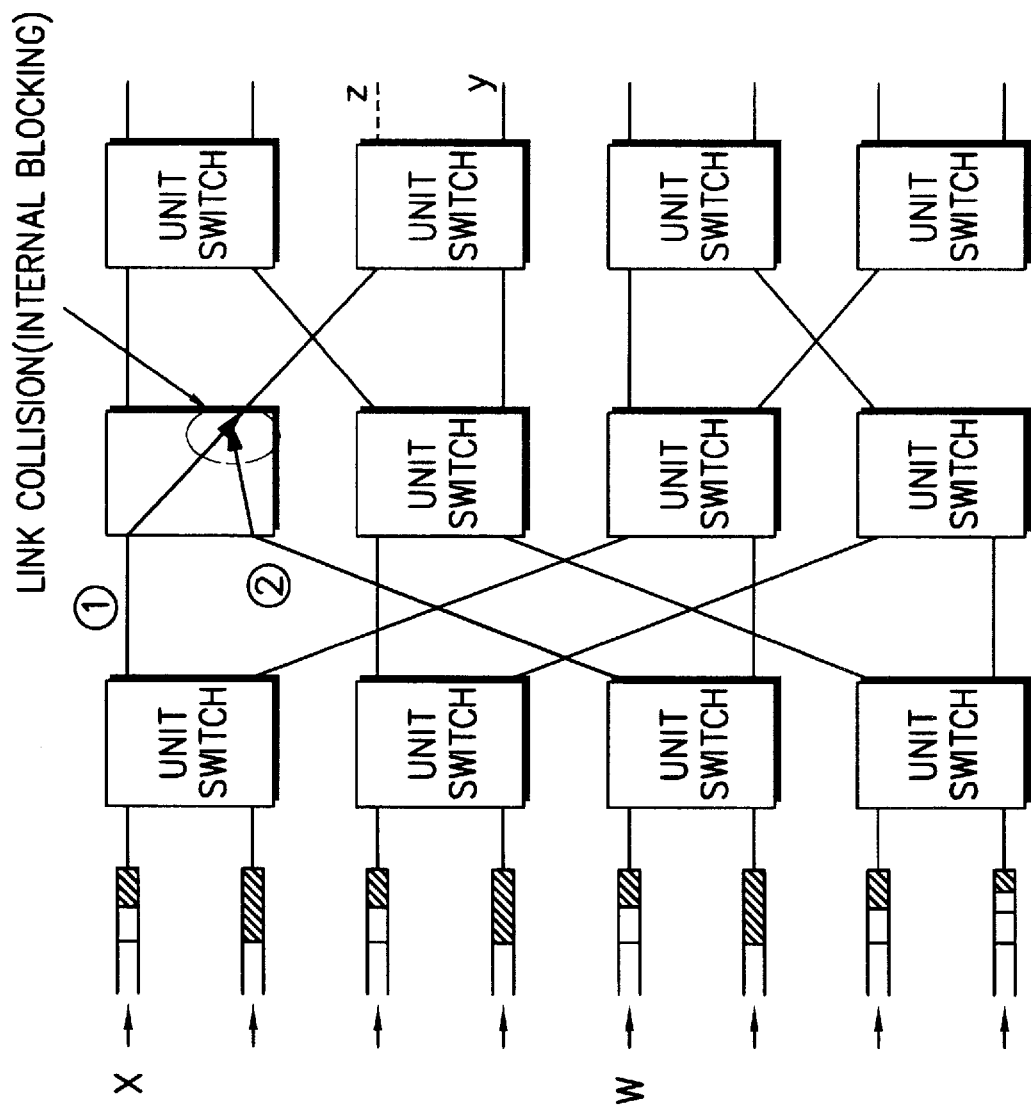
FIG. 3 illustrates an example of a single-path switch network (for instance, 8*8 Banyan network) in which cells' internal blocking is caused.

FIG. 3 illustrates a configuration of 8*8 Banyan network having a single path in which internal blocking frequently occurs when the cells are transferred from an input port x to an output port y and from an input port w to an output port z via a cell transfer path. In this case, the cells collide at the second stage of the unit switches, causing internal blocking. However, the single-path switching network has a simple internal routing and is easy to operate in spite of the internal blocking. In case of the multiple-path switch network, the probability of internal blocking is small but the control of routing for the multiple paths is too complicated to be applied to a large volume of switches. This is because the switch network's control speed for routing does not reach the cell transfer speed.

Figure 2:
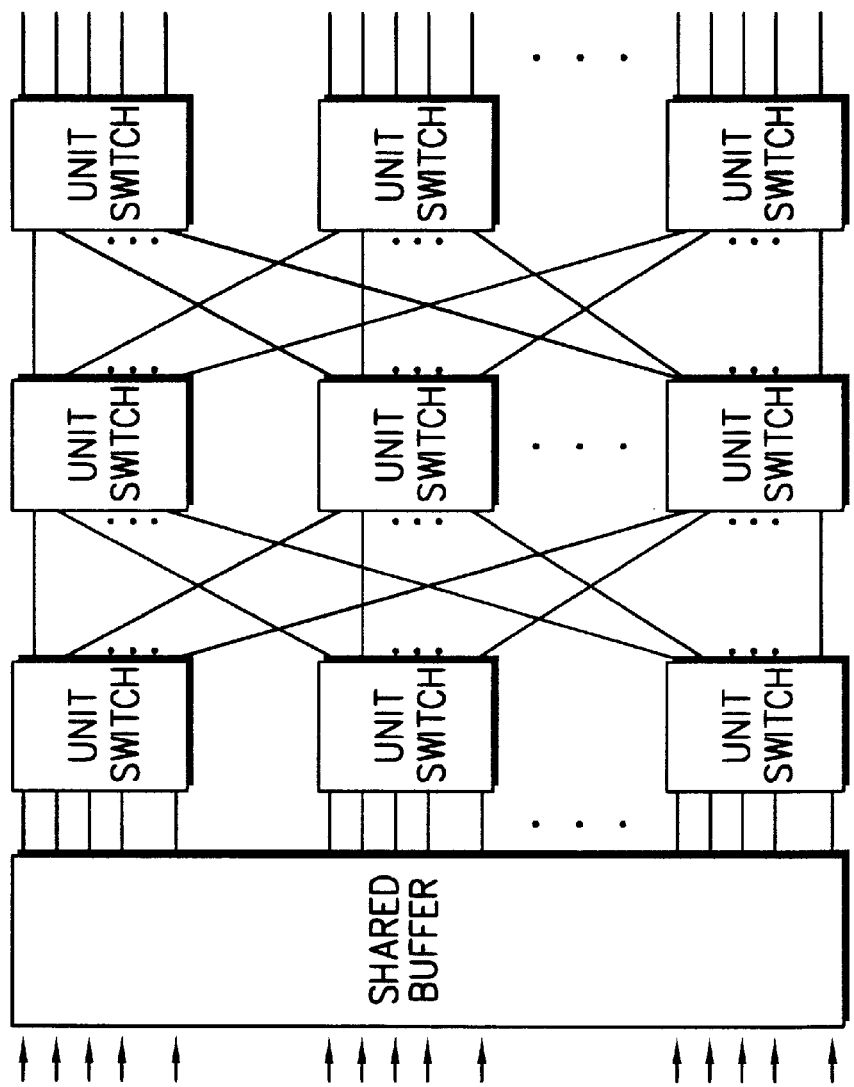
FIG. 2 illustrates the structure of a space-division multi-path switch network having a buffer shared by its input ports.
Figure 4:
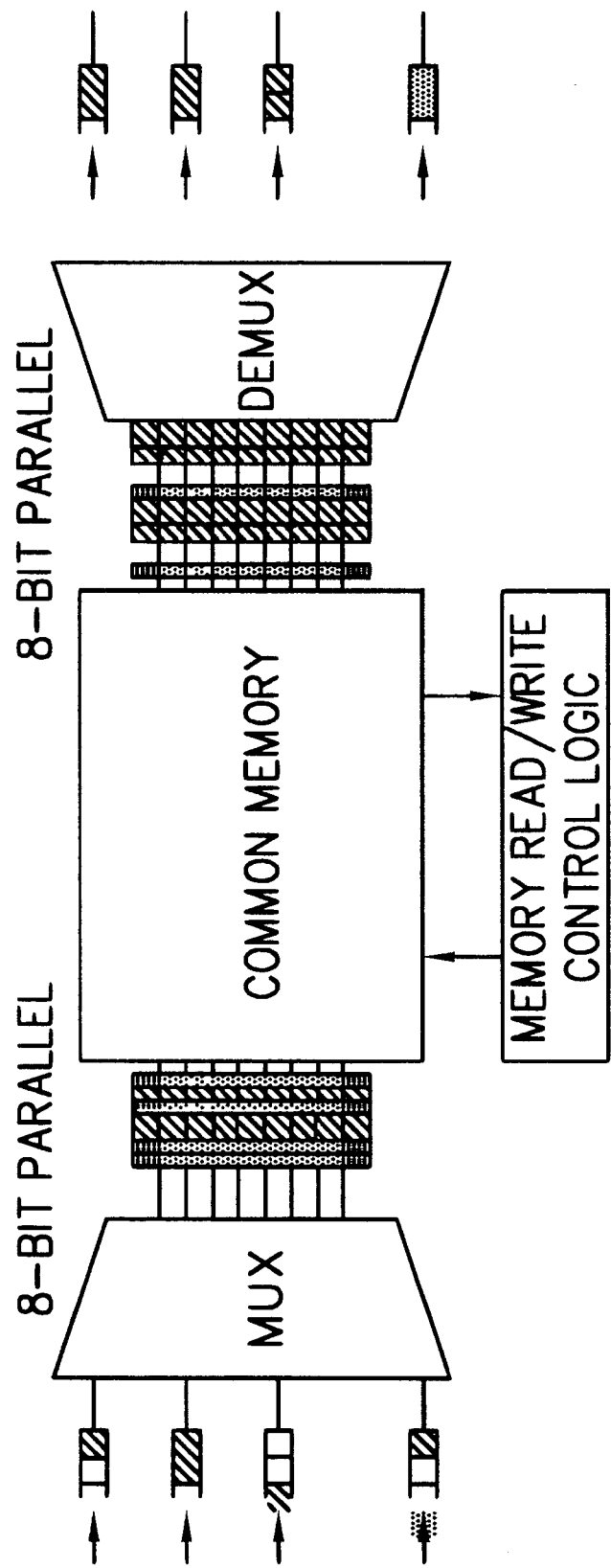
FIG. 4 illustrates an example of a common-memory switch network.

FIG. 2 illustrates a typical multiple-path space division switching network in which a shared buffer is used as its input buffer and in which the overflow of input data caused in the dispersed buffer type can be eliminated. FIG. 4 illustrates an example of a common-memory switch network internally having an eight-bit parallel configuration. The common-memory (time-divided) switch network has a simple structure of performing switching in the same concept as the switch in the conventional switching system, as shown in FIG. 4. However, in the ATM switching network whose transfer speed is hundreds of Mb/s, it is impossible to implement a large volume of switches despite of parallel transfer because its transfer speed is far faster than a memory operation speed. According to current semiconductor technology, the largest implementable size of the switching network is within 8*8 in case of eight-bit parallel data transfer.

As described above, the conventional ATM technique selects an easy-to-implement mode among time division/ space division, buffer usage, single path/multiple path in the ATM switching network. However, the conventional ATM switching network, as I have observed, has the following problems.

First, if the ATM switching network is time division, its capacity is so limited due to the limitation of commercially available memory access time. For instance, in an eight-bit parallel ATM switch network, the size of switch network manufactured is 4–8 ports.

Second, if the ATM switching network has multiple paths, the routing paths are multiple from the input port to the output port so that this should be analyzed for every call so as not to cause internal blocking in the switching network. However, this technique requires a very sophisticated control algorithm, and is therefore impossible for implementation as the size of switching network becomes larger.

Third, if the dedicated buffer is implemented as an input buffer allocated for every input port in the space-division input buffer switch network, the probability of overflow of buffer becomes larger according to the input traffic characteristics, causing service quality deterioration due to cell loss. In addition, the buffer utility efficiency is so low that the buffer cost increases in order to satisfy the performance as in the shared buffer mode.

Figure 5:
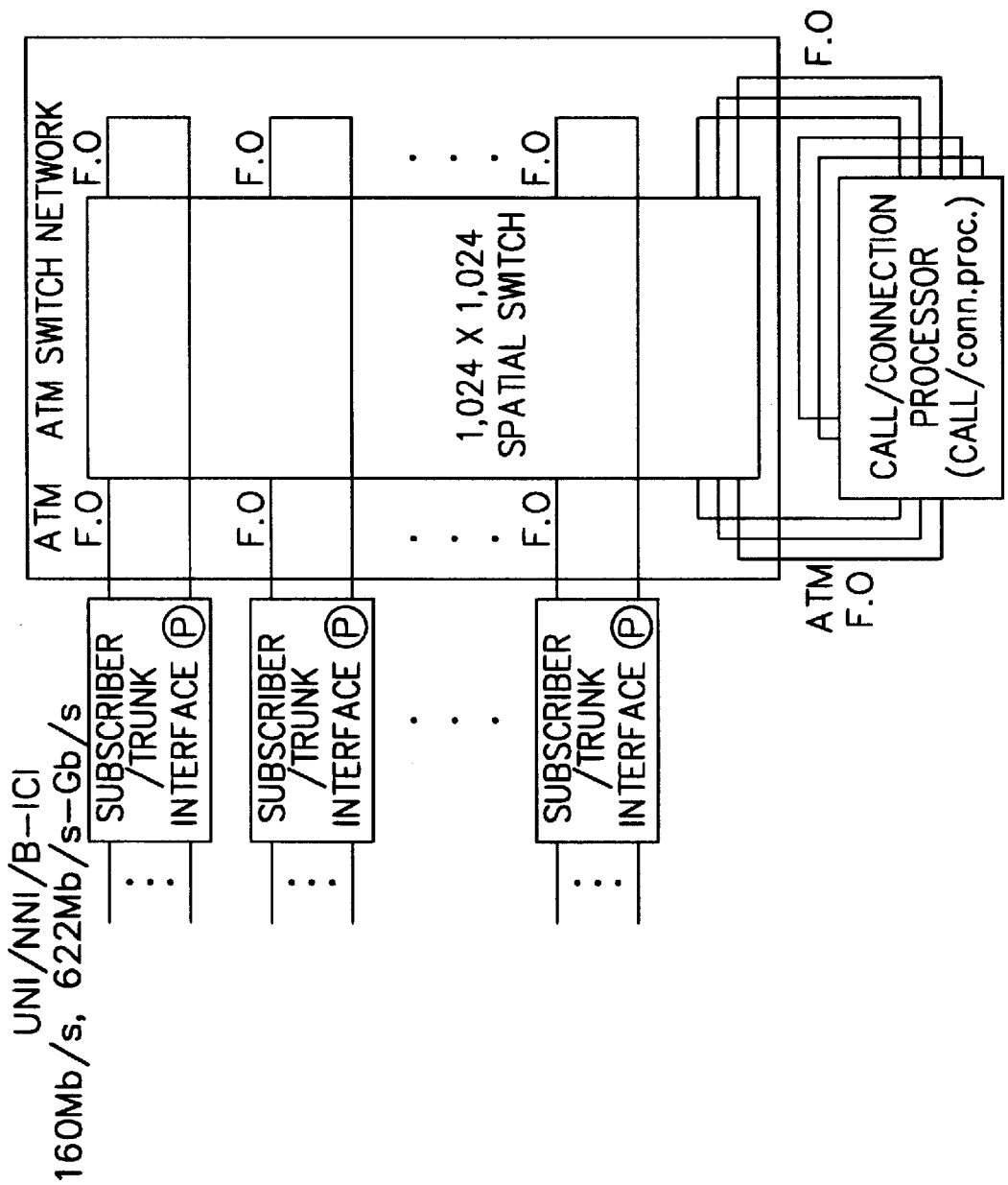
FIG. 5 illustrates the structure of an ATM switching system constructed according to the principles of the present invention.

Turning now to FIG. 5 which illustrates an ATM switching system constructed according to the principles of the present invention. A preferred embodiment of the present invention suggests the structure, function and implemented apparatus of an ATM switch network used in the ATM switching system of one of the ATM network components. In this invention, it is assumed that the ATM switch network is 1,024*1,024 volume. As shown in FIG. 5, the ATM switching system includes a plurality of subscriber/trunk interfaces 4, an ATM switch network 6, and a call/ connection processor 8.

The subscriber/trunk interface 4 connects the subscriber or trunk link, and performs various functions for ATM cell switching inside the ATM switching system. In the ATM switching system, 53 bytes of information transfer unit called "cell" is used, and switching is performed in unit of cells even in the ATM switch network.

The ATM switch network 6 performs switching function and multicast function for transferring input cells to their intended destinations. The destination information (routing tag) of the cells is determined by the call/connection processor when a call is established, and transferred to the subscriber/trunk connector. In a field of the cells input to the subscriber/trunk interface, routing related information is written for every cell on basis of the destination information. According to the written information, self-routing is performed in the ATM switch network, which is the switching function. The multicast is a function performed in case of transferring cells to at least two reception sides from one transmission side, and requires a process of copying as many cells as necessary.

The call/connection processor 8 requires call/connection management (signaling . . . ), routing control, operation/ maintenance (OAM), and resource management. The control/maintenance (OAM) portion performs the overall operation control and management in the switching system, such as call setting/release through internal communication between the lower processors located in the subscriber/trunk interface, ATM function, and the overall system maintenance.

Figure 6:
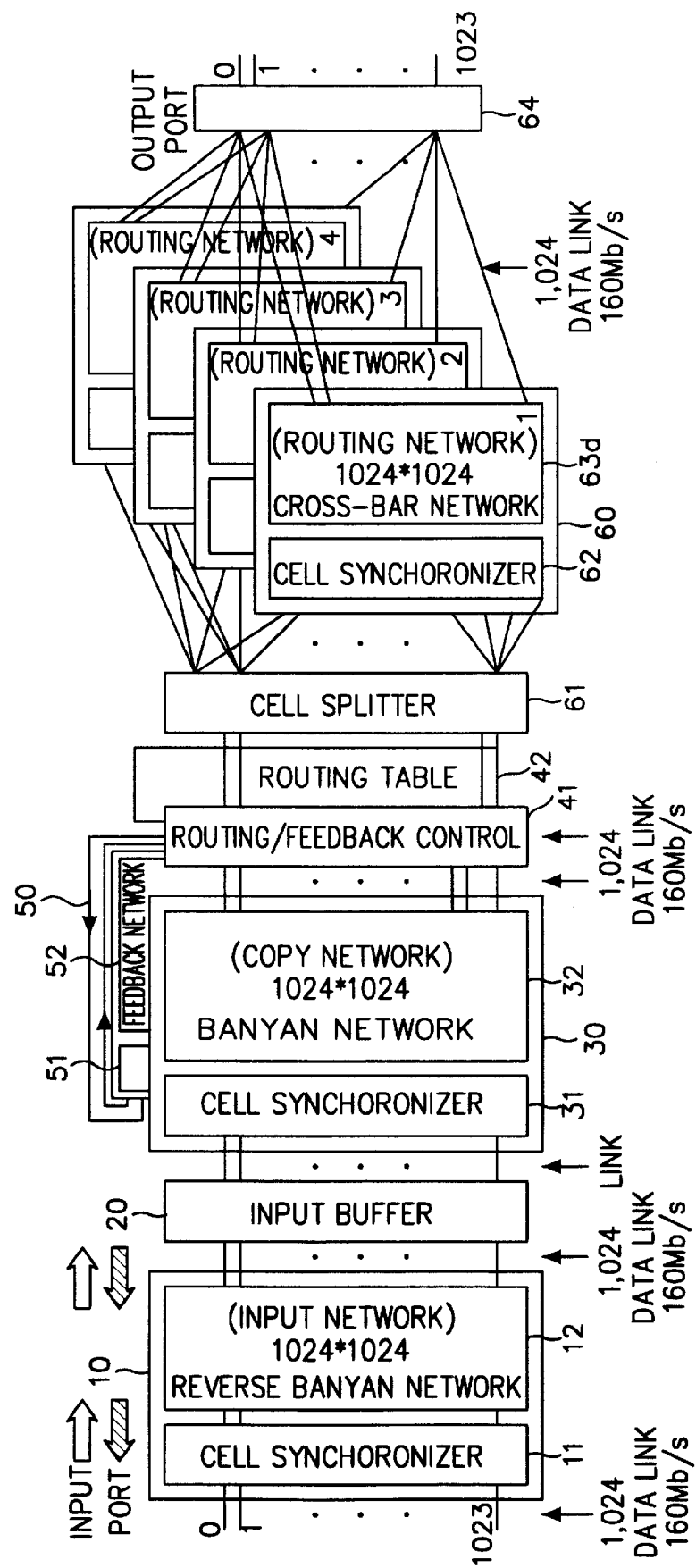
FIG. 6 illustrates a configuration of an ATM switch network implemented according to the principles of the present invention.

Referring now to FIG. 6 which illustrates an ATM switch network 6 of the ATM switching system constructed according to the principles of the present invention. The ATM switch network includes an input network 10, an input buffer 20, a copy network 30, a routing/feedback control 41, a routing table 42, a feedback network 50, a cell splitter 61, a routing network 60 and an output port 64.

The ATM switch network 6 takes an example of 1,024*1, 024 volume and its function implementation. The respective sub-networks forming the switch networks such as input, copy, feedback and routing are made with unit switches of 32*32 volume. For the input network and feedback network, a reverse Banyan network is used. For the copy network, a Banyan network is used. For the routing network, a variety of switch networks may be used, but a crossbar (X-bar) is preferably used herein for high performance and simple implementation so that internal blocking may be prevented.

The structure of the ATM switch network of the present invention is divided into input network 12, copy network 32, feedback network 52, and routing network 63. Each of the networks is formed with unit switches of 32*32 volume at two stages. Here, the unit switches of input network 12 and feedback network 52 use a reverse Banyan network, the unit switch of copy network 32 uses a Banyan network, and the unit switch of routing network 63 uses a crossbar network. When the ATM switch network of FIG. 6 is formed at the volume of 1,024*1,024, the Banyan network and reverse Banyan network maintain their properties even though the unit switches of 32*32 volume are made at two stages. However, the crossbar network cannot maintain internal non-blocking. In this case, blocking may be caused inside the routing network 63, and its performance decreases. In order to recover this, a plurality of routing networks, for instance, four networks 63a–63d, are used in this invention.

In FIG. 6, cell synchronizers 11, 31, 51 and 62 located at the front ends of the input network 12, the copy network 32, the feedback network 52 and the routing network 63 respectively, are used because synchronization is required at the level of bit and cell. The synchronization is necessary because the input speed of cells input to the respective networks is 160 Mb/s, and the networks may be placed at physically different locations.

Referring to FIG. 6, cell synchronizers 11, 31, 51 and 62 are located at the input stage of 32*32 unit switch of the respective networks 12, 32, 52 and 63. The cell synchronizers perform 160 Mb/s bit synchronization and cell synchronization.

Input network 12 uses a 1,024*1,024 reverse Banyan network, and is made up with 64 unit switches (32*32 reverse Banyan networks). Input network 12 is connected between cell synchronizer 11 and input buffer 20, and performs the function of fetch and add of the input cells and the function of storing the input cells to input buffer 20.

Input buffer (input queue) 20 stores the input cells output from input network 12. The size of input buffer 20 is determined by the size of input port and input cells (1,024 port*x cells=xxx cells).

Copy network 32 uses a 1,024*1,024 Banyan network, and is made up of 64 unit switches (32*32 Banyan networks). Copy network 32 is connected between cell synchronizer 31 and routing/feedback controller 41, and performs the function of fetch and add of the cells and the function of cell copy.

Feedback network 52 uses a 1,024*1,024 reverse Banyan network, and is made up with 64 unit switches (32*32 reverse Banyan networks). Feedback network 52 is connected between cell synchronizer 51 and routing/feedback controller 41, and performs the fetch and add of the cells fedback and the function of cell copy.

Routing table 42 stores the routing information including virtual path identifiers, virtual channel identifiers (VPIs/VCIs) and routing tags of the cells in the ATM switch. Routing/feedback controller 41 receives cells from copy network 32 and feedback network 52, and controls the routing of the cells input, with reference to the routing information of routing table 42. Routing/feedback controller 41's routing control performs the function of offering the routing information (VPI/VCI) and self-routing tag to the input cell header. The feedback control presents cell loss due to internal blocking of the ATM switch network and the output port contention.

Cell splitter 51 performs the function of splitting cells output from copy network 32 and feedback network 52. In this invention, cell splitter 51 splits and transfers the input cells to the multiple routing networks 63 in order to prevent the internal blocking of the ATM switch network and the output port contention. It is assumed in this invention that four routing networks 63a–63d are used. The routing networks are formed with crossbars 1,024*1,024 crossbar networks, and with 64 unit switches (32*32 crossbar networks). The routing networks perform self-routing. Cell merger 64 stores the cells output from routing networks 63a–63d in the output buffer of the ports, and outputs them.

The structure and function of the respective networks will be described below with reference to FIG. 6.

Input network 12 performs the function of fetch and add in which input buffer 20 for storing the cells input from the input ports is controlled to be shared by the input ports. According to the fetch and add function, all the input cells of the input ports receive input buffer 20's address where they are to be stored, and are stored in input buffer 20 according to the address after input network 12. Input buffer 20 is a shared buffer and not a dedicated buffer so that it has an excellent utility efficiency and is very effective in the burst traffic environment. The cells stored in input buffer 20 are transferred to copy network 32 in its sequence of storage. There is a case of limiting the number of cells transferred to copy network 32 from input buffer 20 during the switch operation. This phenomenon occurs when the number of cells copied in the preceding cell cycle surpasses the capacity of copy network 32 or when the cells fed back are present in feedback network 52.

Copy network 32 is used to provide broadcast or multicast service. Copy network 32 performs the function of copying as many cells as required if the cells received from input buffer 20 are broadcast or multicast cells. Here, the number of cell to be copied is indicated in the cell header in the form of (minimum, maximum). An algorithm for copying cells in cell split mode is used in copy network 32 with the reference to this value. The minimum and maximum are calculated by the result of fetch and add and the number of copy required by the respective cells in copy network 32. Here, if the sum of the number of cells copied surpasses the capacity of copy network 32, the cells surpassed are fetched and added, and input back to copy network 32 in the next cell cycle while not read from input buffer 20.

Feedback network 52 is used to receive from routing/feedback controller 41 the cells unable to pass routing networks 63 in the same cell cycle, as opposed to cells not causing internal blocking or output port contention while passing routing networks 63. The fed back cells are subsequently provided to passing routing networks 63, along with the cells received from copy network 32, in the next cell cycle. Here, routing/feedback controller 41 controls the feedback cells to have priority. Feedback network 52 uses a buffer of one cell per port at the feedback network input stage in order to delay the fed back cells for one cell cycle.

Routing/feedback controller 41 is made up of a routing controller and feedback controller. The routing controller of routing/feedback controller 41 performs the function of adding a routing tag for the cells passing routing networks 63, and performs the cell routing function by converting the cell header. The routing tag is used in cell routing in which the contest of the cells is used by the internal switch networks to search for the intended output port via routing networks 63 by hardware. The cell header conversion is a function of converting the header of the input cells so that the cell header information output from its own node is used in the routing of the next node. The routing related values such as routing tag and cell header conversion information are renewed by the call/connection controller of FIG. 5 whenever the call/connection is set, and stored in routing table 42 until the corresponding call/connection is released.

The feedback controller of routing/feedback controller 41 performs the function of preventing cell loss due to internal blocking or output port contention in routing networks 63. The feedback control function is performed for every cell cycle, and the cells unable to pass routine, networks 63 are sent to feedback network 52. The number of cells passing routing networks 63 for all the ports is calculated for every cell cycle. This value indicates the number of cells transferred without internal blocking or output port contention in routing networks 63a–63d. Here, the term "internal blocking" means that collision occurs along the internal path even when the cells input to the network require different output ports. The term "output contention" means that the input cells collide at the output port even when they are transferred without internal blocking if the input cells require the same output port.

Cell splitter 61 distributes the cells to routing networks 63a–63d in order not to cause internal blocking and output port contention in routing networks 63 when the cells passing routing networks 63 are input according to the feedback control.

In routing networks 63, cell exchange is actually performed. The input cells from copy network 32 and feedback network 52 are self-routed by hardware and transferred to a desired output port via routing networks 63. Here, the 1,024*1,024 routing network used is a form in which 32*32 X-bar networks are two-stage formed as unit switches. This routing network is not a non-blocking network, and thus may cause performance decrease due to internal blocking in the switch network. Therefore, in the present invention, four parallel routing networks 63a–63d are formed to increase the input/output path of the ATM switch network, and to perform feedback control prior to the cells' input to routing networks 63 so as to eliminate internal blocking. This prevents the deterioration of the switch network. Though the internal blocking is removed from routing networks 63, the performance of the ATM switch network is limited to 58% due to the output port contention. Accordingly, the switch performance approximates 100% if the routing networks 63 are formed in parallel and in plurality and have feedback control, and the ATM switch network eliminates internal blocking and adds the control of output port contention. Forming routing networks 63a–63d of 1,024*1,024 volume with the unit switches of 32*32 increases the amount of hardware, and have multiple paths between the network input ports and output ports. For this reason, 1,024 ports are hard to control in cell routing.

Cell merger 64 stores the cells output from routing networks 63a–63d in the output buffer, and outputs them at a predetermined speed. The output buffer used has a very low efficiency, as compared with the input buffer, because the buffer is dedicated to the respective output ports, unlike the input buffer.

From now on, the functions of input network 12, copy network 32, feedback network 52, and routing network 63 will be described in detail. It is assumed in this invention that the ATM switch network is 1,024*1,024 volume. For this reason, the overall functions of the ATM switch network such as fetch and add function, cell copy and routing must be performed for the entire 1,024*1,024 network, not for the unit switch networks. The ATM switch network of the present invention is formed with input network 12, copy network 32, feedback network 52, and routing network 63. Input cells must pass at least three networks among those networks until they are output finally. The entire operation of the ATM switch network will be explained specifically while divided into input network 12, copy network 32, feedback network 52, and routing network 63.

Figure 7A:
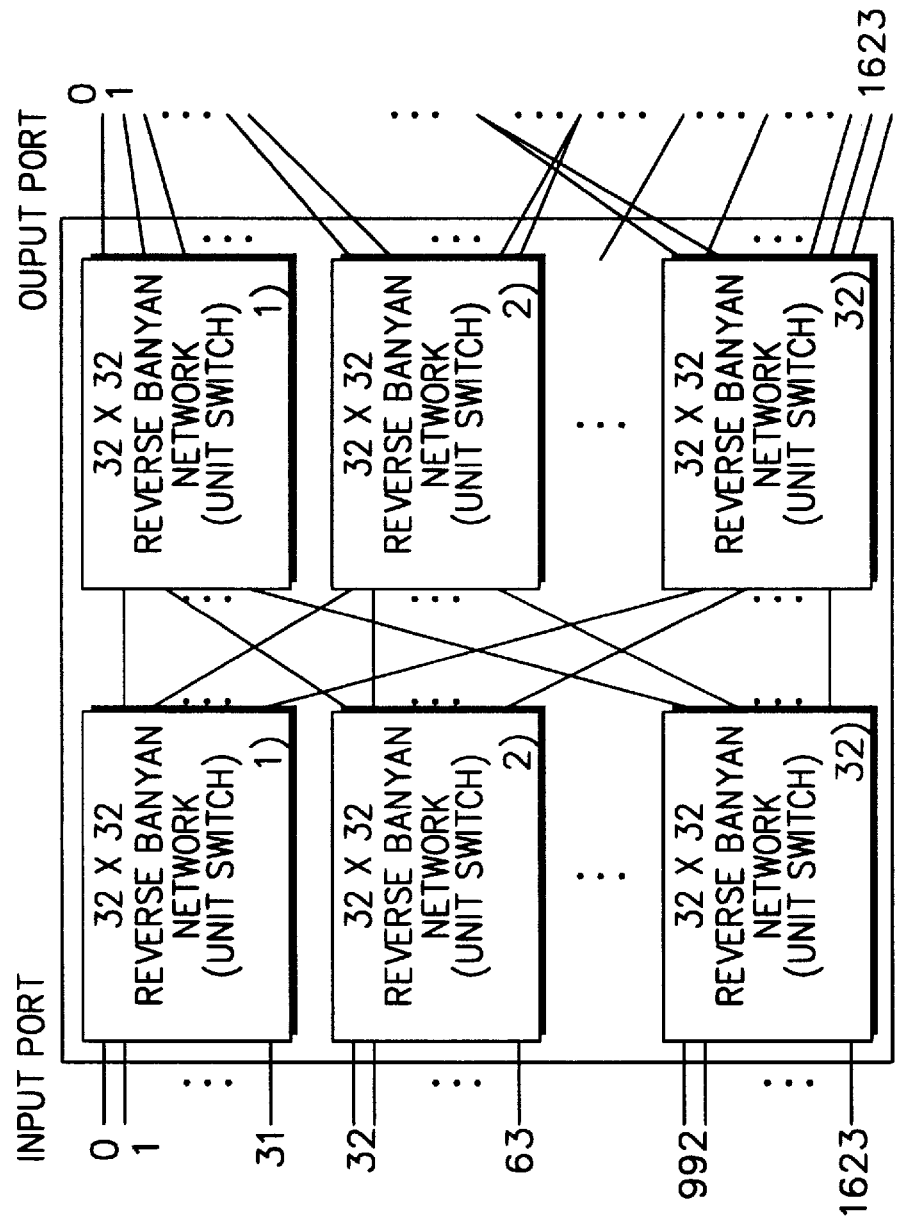
FIG. 7A illustrates an example in which the input network of FIG. 6 is formed in a reverse Banyan network of 1,024*1,024 volume.
Figure 7B:
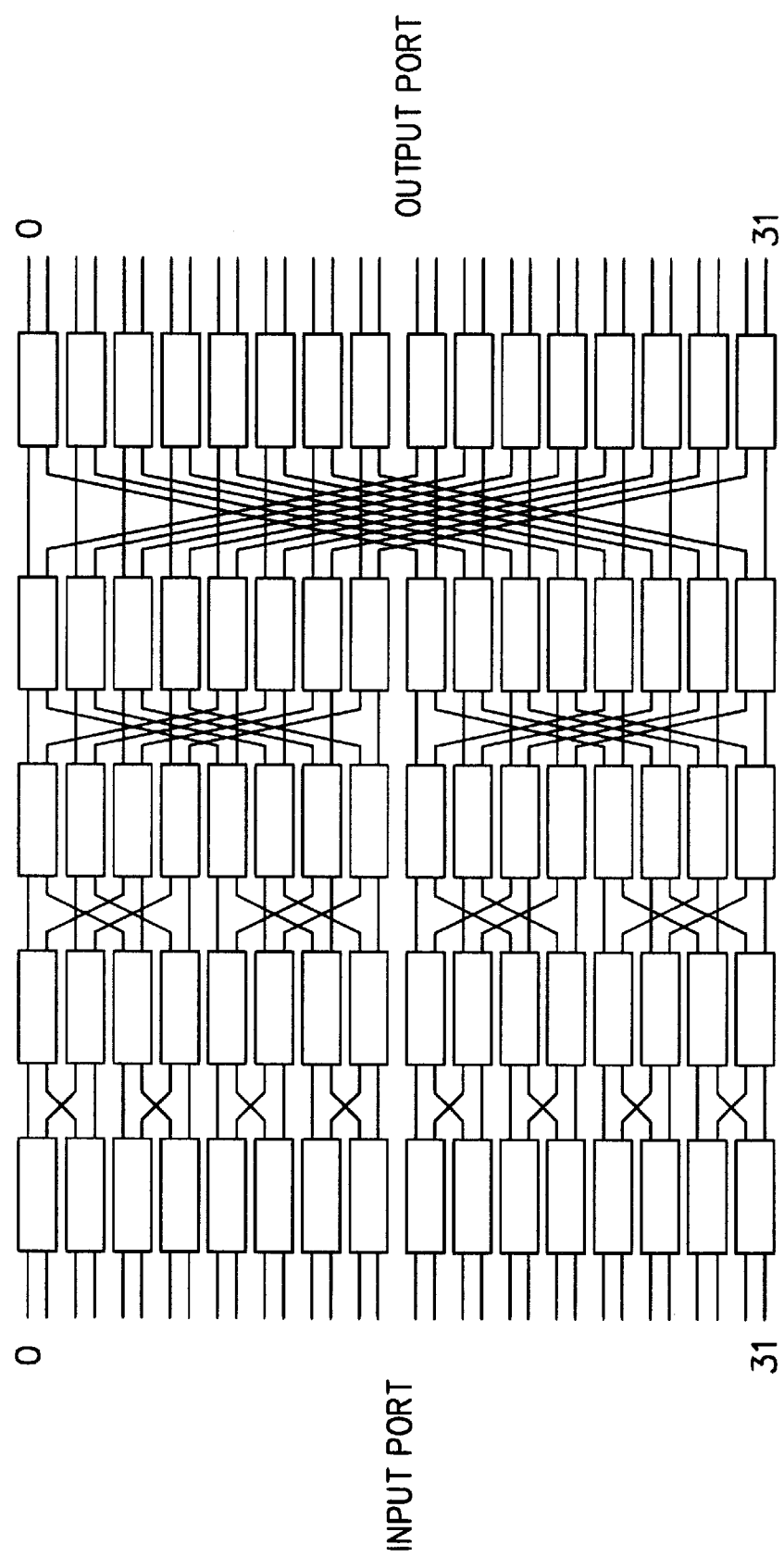
FIG. 7B illustrates an example in which the unit switch of FIG. 7A is formed in a reverse Banyan network of 32*32 volume.

Input network 12 performs the function of fetch and add and cell transfer for using efficiently input buffer 20 when the cells are stored in input buffer 20. The cell transfer is performed by the 1,024*1,024 reverse Banyan network. The fetch and add function may be implemented in the reverse Banyan network because it has the conceptually same structure as the reverse Banyan network. However, the fetch and add function is implemented by hardware separate from the reverse Banyan network because it does not require the entire reverse Banyan network and is not intended to transfer cells as in input network 12. Input network 12 is made with the unit switches of 32*32 reverse Banyan networks at two stages, as in FIG. 7A for easier hardware implementation. The 32*32 reverse Banyan network has the structure as in FIG. 7B. The detailed function of input network 12 will be described with reference to FIGS. 7A and 7B as below.

According to the fetch and add function of input network 12, a buffer address where the cell itself is stored is provided so that all the cells received to the input ports of the ATM switch network are stored sequentially to input buffer 20. Here, the buffer address is given so that input buffer 20 is shared by all the input ports. In the process of giving the buffer address, there are required a bit indicative of whether the input ports have active cells or not, and bits where the input buffer address is written. These kinds of information are written in the cell header. The fetch and add function is carried out in the form of pipe line for every cell cycle, along with the cell transfer function. The fetch and add function for the input cells in the nth cycle is performed in the n−1 th cycle. In the nth cycle, the fetch and add of the cells input in the n+1th cycle is performed.

Figure 8A:
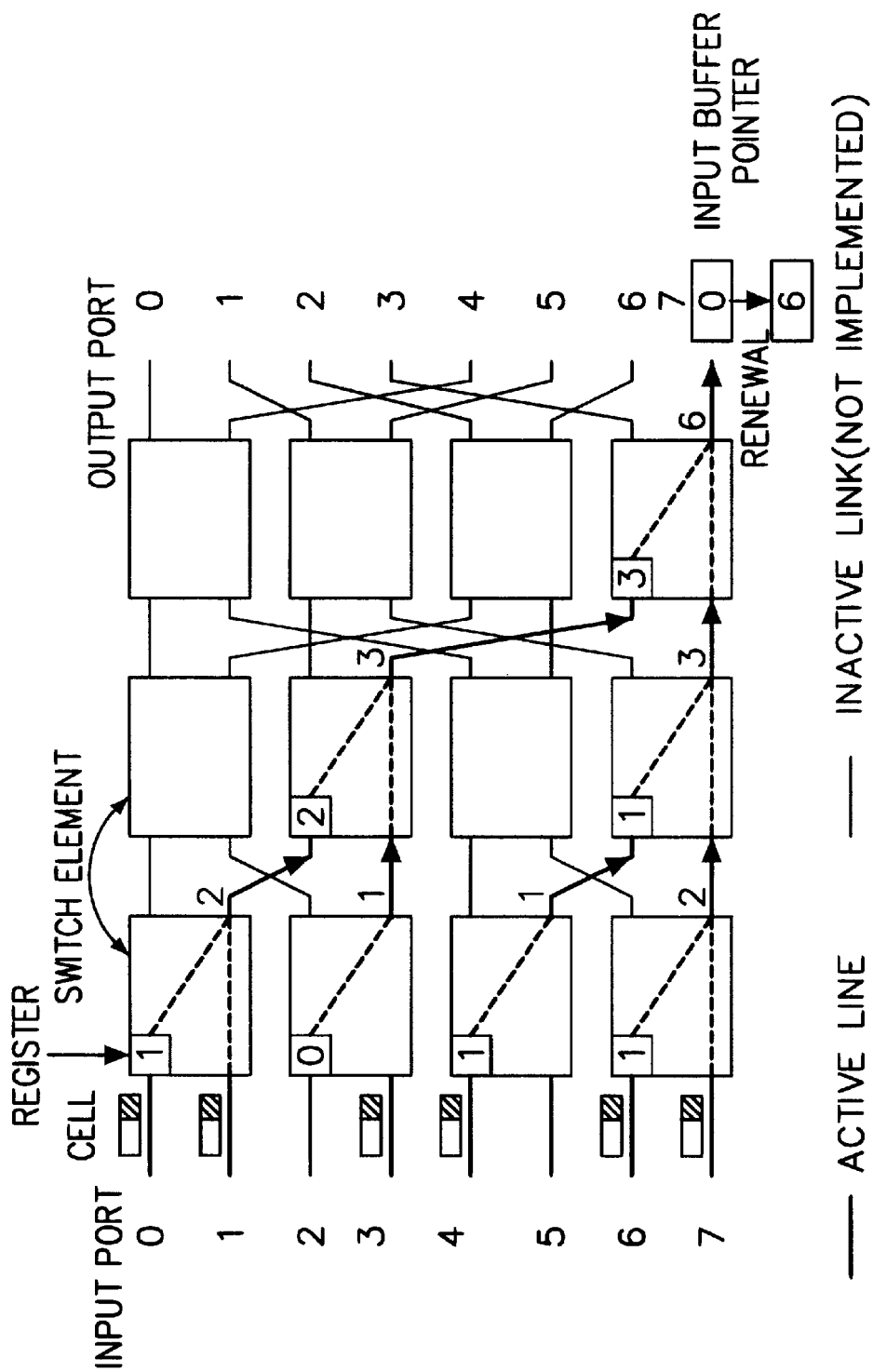
FIG. 8A illustrates the first step of fetch and add function in which the number of cells input from the input network is added, taking an example of the input network of 8*8 volume.
Figure 8B:
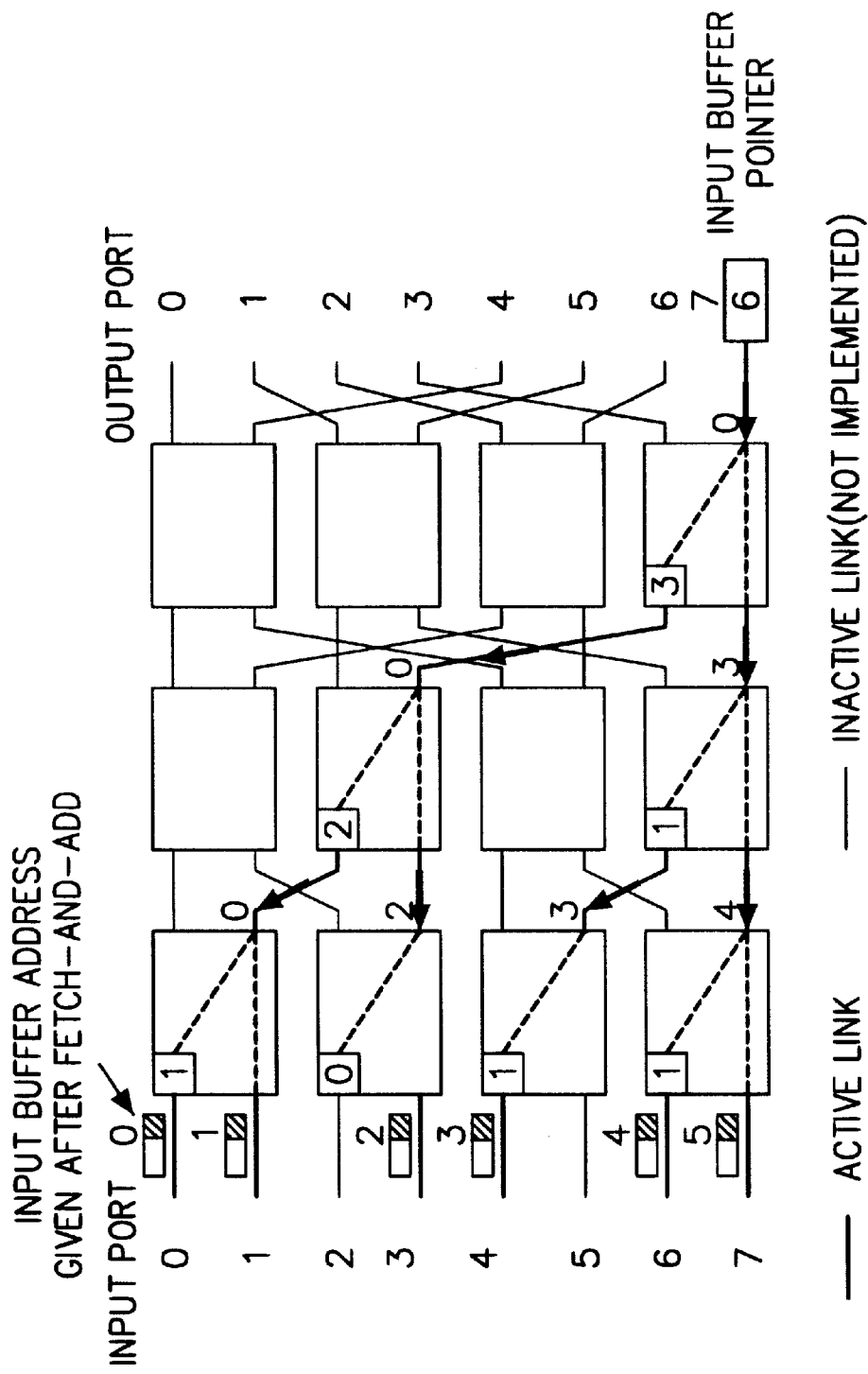
FIG. 8B illustrates the second step of fetch and add function in which the address of the input buffer is transferred from the input network, taking an example of the input network of 8*8 volume.

FIGS. 8A and 8B illustrate a procedure of storing the input cells in input buffer 20, taking an example in which the input cells are six and the input buffer pointer is 0 with respect to single cast in the volume of 8*8. The pointer of input buffer 20 represents the start address of input buffer 20 where the cells are stored for the present cycle. Referring to FIGS. 8A and 8B, there will be described the first and second steps of performing input network 12's fetch and add function.

First of all, referring to FIG. 8A, the first step of fetch and add function, that is, the procedure of adding the cells from the input port to the output port, proceeds as below. Here, the switch elements are indicated as just elements.

In case that a cell input to the higher input port is present at the first stage 2*2 element of input network 12, a number "1" is written at the register of the element, regardless of whether the lower input port receives a cell or not. The cells input to the higher and lower input ports of the first stage element are summed to be sent to the lower output port. This value is input to the element connected to the second stage.

In the same manner as at the first stage, with respect to the cells input to the element at the second stage, the number of cells input to the higher input port is written in the register of the element, and the cells input to the higher and lower input ports are summed and then sent to the lower output port. This value is input to the element connected to the third stage.

Also at the third stage, with respect to the cells input to the element, the number of cells input to the higher input port is written in the register of the element, and the cells input to the higher and lower input ports are summed and then sent to the lower output port.

After the above process, the result of summing of the cells inputs is output to the lowest port at the final stage, as shown in FIG. 8A. This final value is added to the pointer register value of input buffer 20, and its result is stored back in the input buffer pointer register. This value indicates the start address of the input buffer in the next cell cycle. In the example of FIG. 8A, the pointer value of the preceding step is assumed to be 0, and six cells are newly input so that the pointer value is renewed to six.

Referring now to FIG. 8B, the second step of the fetch and add function, that is, the procedure of transferring the address of input buffer 20 from the output port to the input port, is performed as below.

The pointer value "0" stored in the preceding cell cycle is input by the lowest output port at the final stage and transferred to the second stage element via the higher input port. Through the lower input port, the value transferred is added to the value written at the element register in the first step of fetch and add, and sent to the second stage element.

The second stage element transfers the value received from the third stage to the first stage element via the higher input port. Through the lower input port, the value transferred is added to the value written at the element register in the first step of fetch and add, and sent to the first stage element.

In the first stage element, the value received from the second stage is transferred to the higher input port. This value is added to the value written at the element register in the first step of fetch and add, and sent to the lower input port.

After the above procedure, the cells of the overall input ports receive the address of input buffer 20 where they are to be stored. The cells receive their input buffer addresses 0, 1, 2, 3, 4 and 5 sequentially from the cell of the highest port of the input ports where the cells are input, because the input cells are six in FIG. 8B. FIGS. 8A and 8B illustrate the procedure of summing the number of cells in the first step and the procedure of transferring the address of the input buffer in the second step when an input network of 8*8 is implemented. FIG. 9A illustrates the first and second steps of fetch and add in the input network 12 of 1,024*1,024 volume.

Figure 8C:
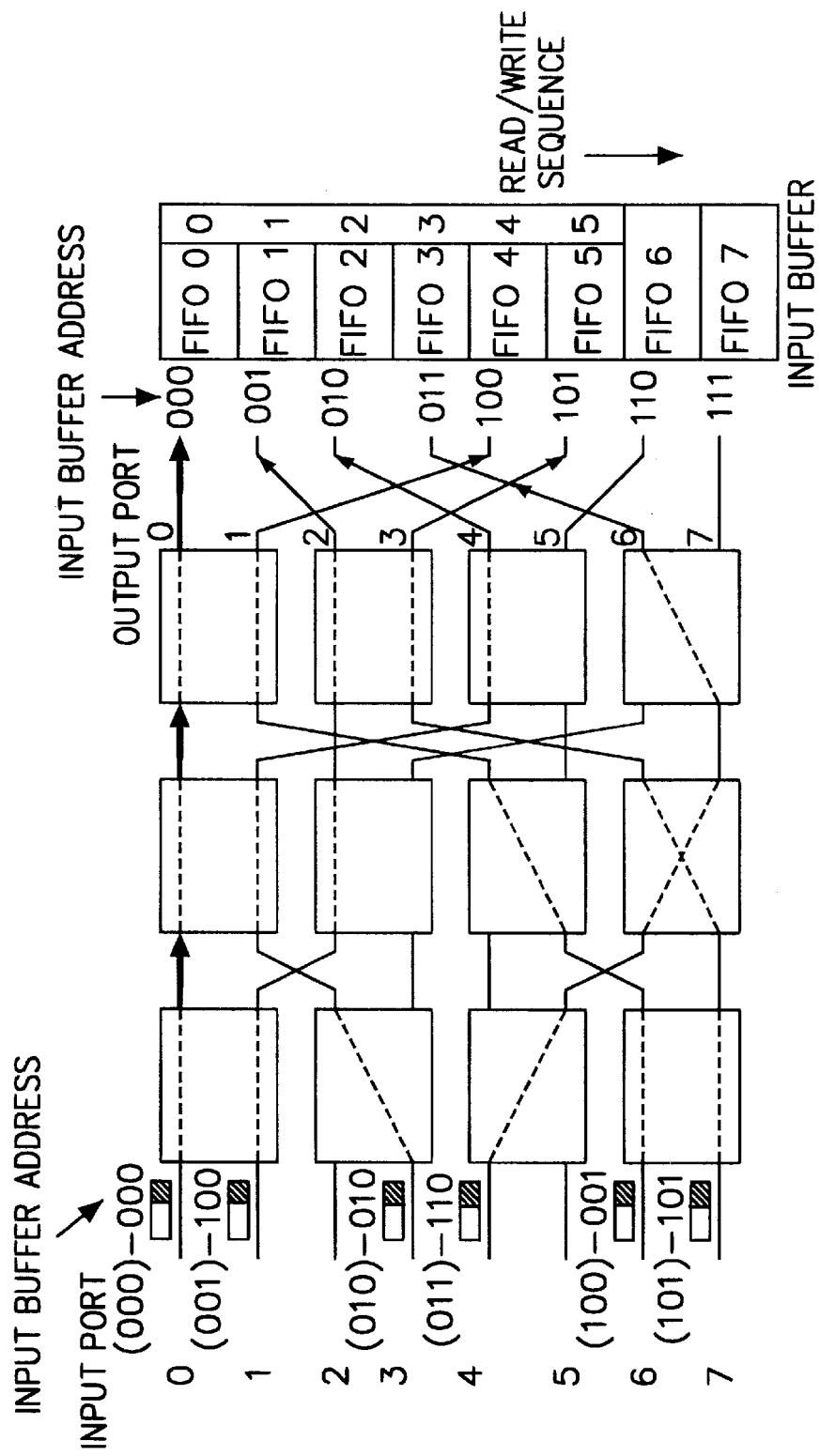
FIG. 8C illustrates the step of transferring cells after the fetch and add function at the input network, taking an example of the input network of 8*8 volume.

Third, after the first and second steps of fetch and add, cell transfer is performed as in FIG. 8C. Referring to FIG. 8C, the input network 12's cell transfer is carried out in such a manner that all the cells obtain their input buffer addresses where they are to be stored, from the fetch and add function, and then they are used as the rounding tag of the cells to pass through the reverse Banyan network. Here, for the rounding tag, the bit stream obtained in the fetch and add function is not used without change but its bit order must be altered in order for the input cells to pass without internal blocking in the reverse Banyan network. If the result of fetch and add is (b1, b2 and b3), the order of the rounding tag used in the reverse Banyan network becomes (b3, b2 and b1). The procedure of storing the cells in the input buffer via the input network according to the rounding tag produced as above is depicted in FIG. 8C.

Figure 9B:
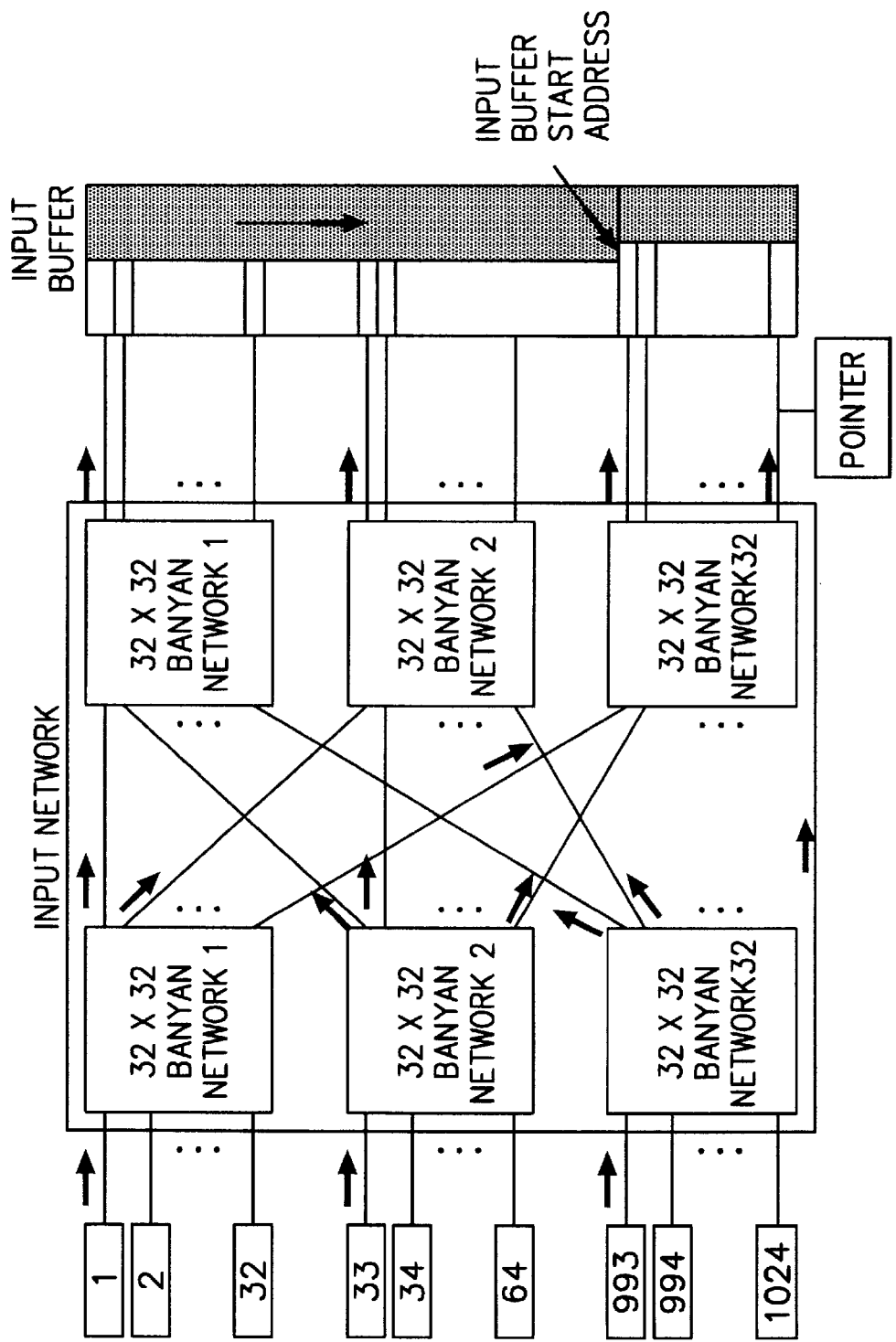
FIG. 9B illustrates the procedure of performing a cell transfer function at the input network of 1,024*1,024 volume.

FIG. 8C illustrates a procedure of transferring cells according to the input buffer addresses operated by performing the fetch and add function when an input network of 8*8 volume is implemented. FIG. 9B illustrates a procedure of cell transfer in the input network 12 of 1,024*1,024 volume.

Figure 10A:
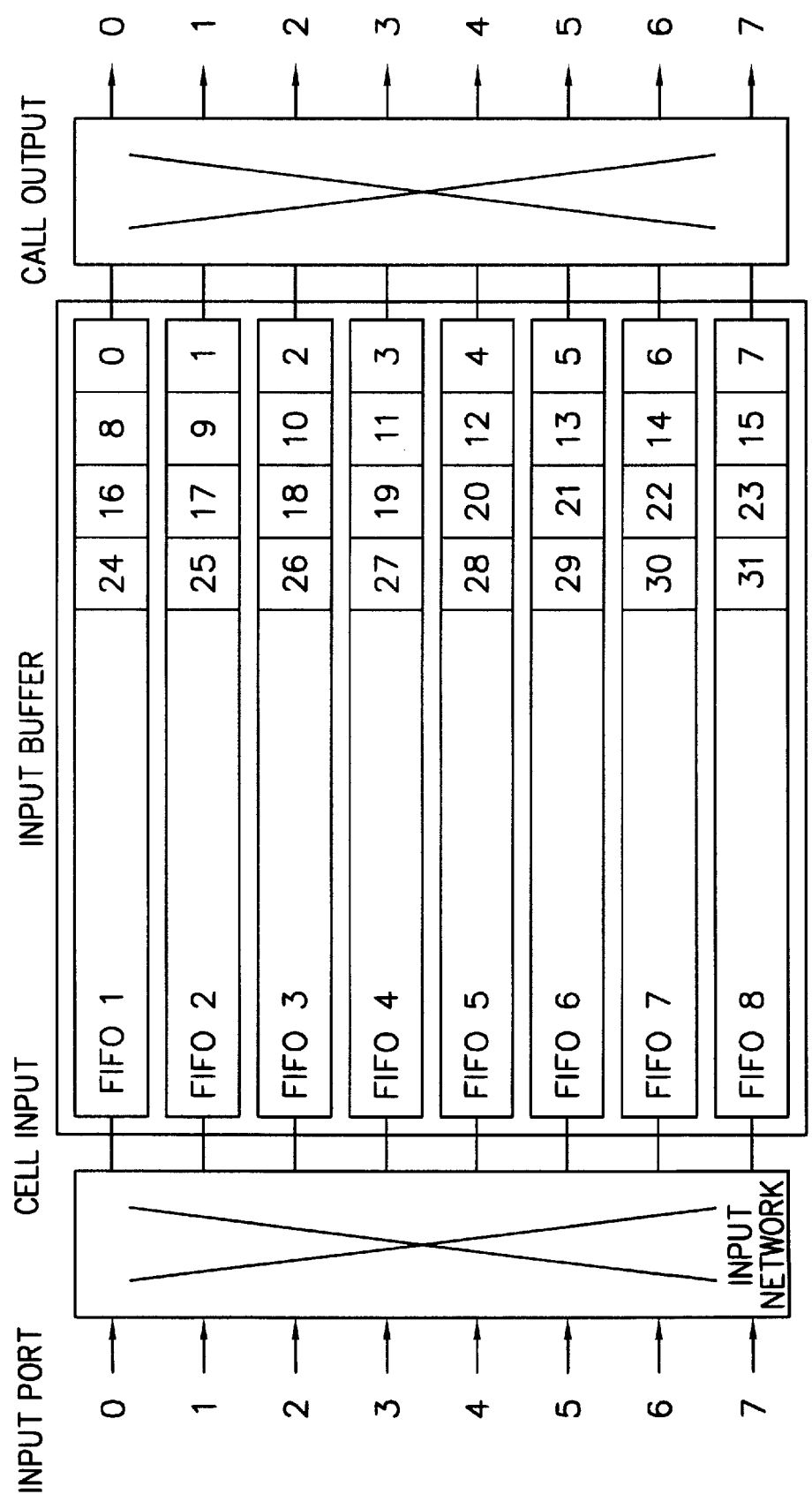
FIG. 10A illustrates the structure of the input buffer in FIG. 6, taking an example of the input network of 8*8 volume.
Figure 10B:
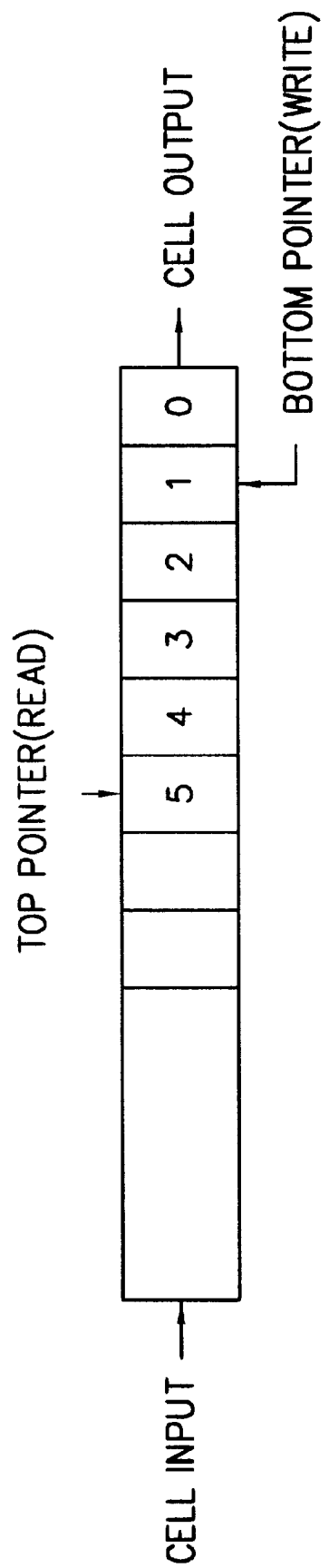
FIG. 10B illustrates the conceptual structure of the input buffer as shown in FIG. 10A.

Second, the configuration and operation of input buffer 20 (input queue) will be explained. Input buffer 20 stores cells transferred via input network 12, having a configuration shown in FIG. 10A. FIG. 10A illustrates the configuration of input buffer 20 in case of 8*8 switch. FIG. 10B illustrates a conceptual structure of input buffer 20 shown in FIG. 10A.

In FIG. 10B, the bottom pointer indicates the start position of the input buffer 20's addresses where newly input cells are stored. The top pointer indicates the start position of the addresses where the cells stored in input buffer 20 are read. These top and bottom pointers are controlled according to the cells' input/output condition. FIG. 10A illustrates the address sequence of a FIFO memory forming input buffer 20. As shown in FIG. 10A, all the input ports share all the FIFOs, while each of the ports does not use a predetermined FIFO. In order to share the buffers, input network 12 performs the fetch and add function as the pre-step operation. The cells input to the ATM switch network are stored in input buffer 20, and read sequentially in order to be transferred to copy network 32 for every cell cycle.

Third, the configuration and operation of copy network 32 will be explained. Copy network 32 performs the fetch and add function and copy function for the purpose of cell copy. The maximum number of cells copied by copy network 32 within one cell cycle is determined according to the capacity of copy network 32. Here, if the number of cells copied surpasses the capacity of the copy network, the cells surpassed are copied in the next cell cycle. Here, split may be caused in which part of cells to be copied are copied. In this case, the rest of cells split are supposed to be copied in the next cell cycle. The fetch and add function of copy network 32 is performed with the same hardware as that of input network 12. For its cell copy function, the Banyan network is used. The details of copy network 32 performing the above function are as follows.

First, the fetch and add function of copy network 32 will be explained. The function of offering the copying number of cells to all the cells input to the respective input ports is performed by the fetch and add function of copy network 32. A cell header, required to perform the fetch and add function, needs a bit indicative of the copying number of cells and bits where information for copy is to be written. The information obtained from the fetch and add function is controlled to perform the actual copying function through a copy algorithm. This copying information is formed in the form of (minimum, maximum), using the number of copying of the respective cells and the number of copying of the overall cells.

Figure 11A:
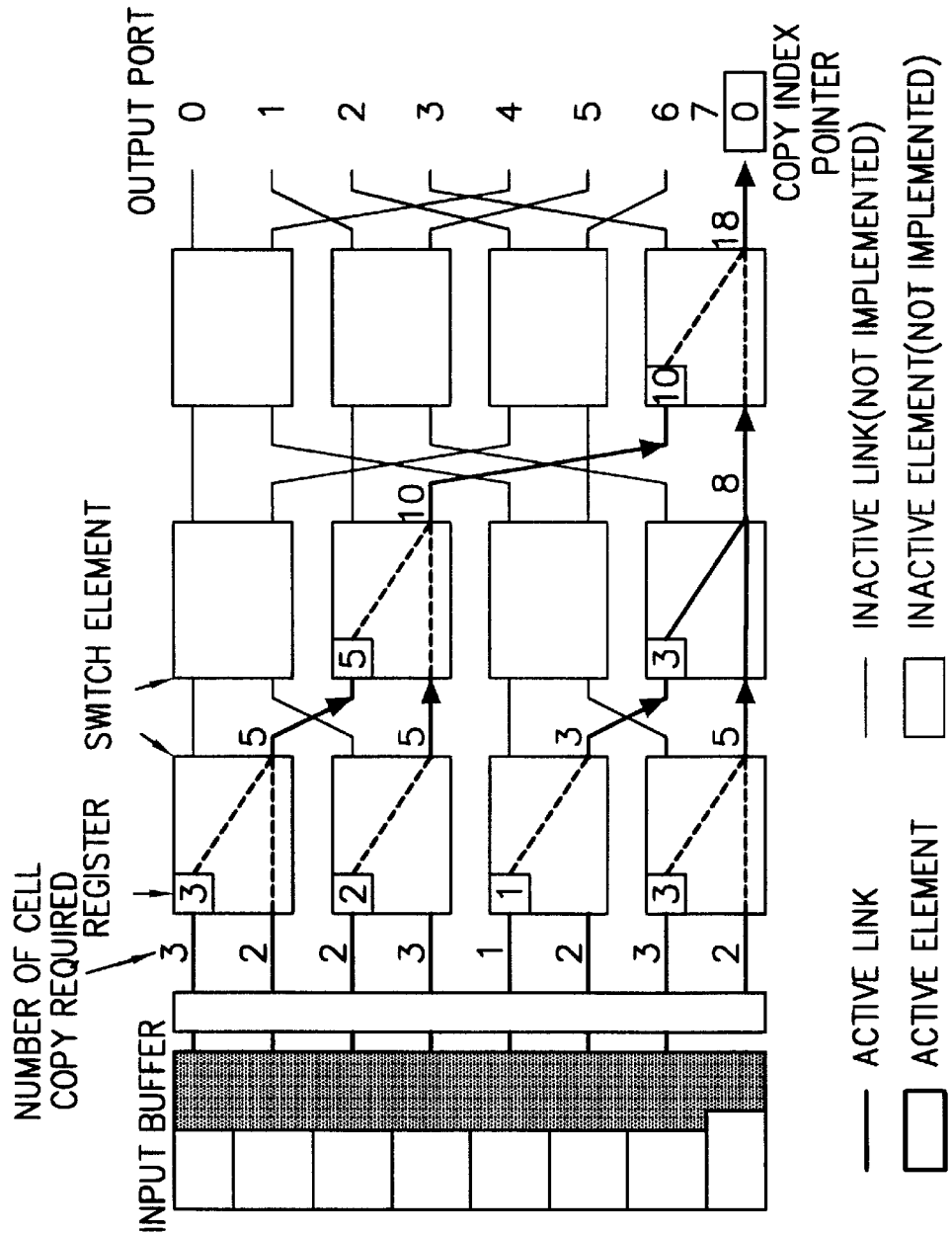
FIG. 11A illustrates the procedure of performing the first step of fetch and add function in which the number of cell copy is added in the copy network, taking an example of the copy network of 8*8 volume.
Figure 11B:
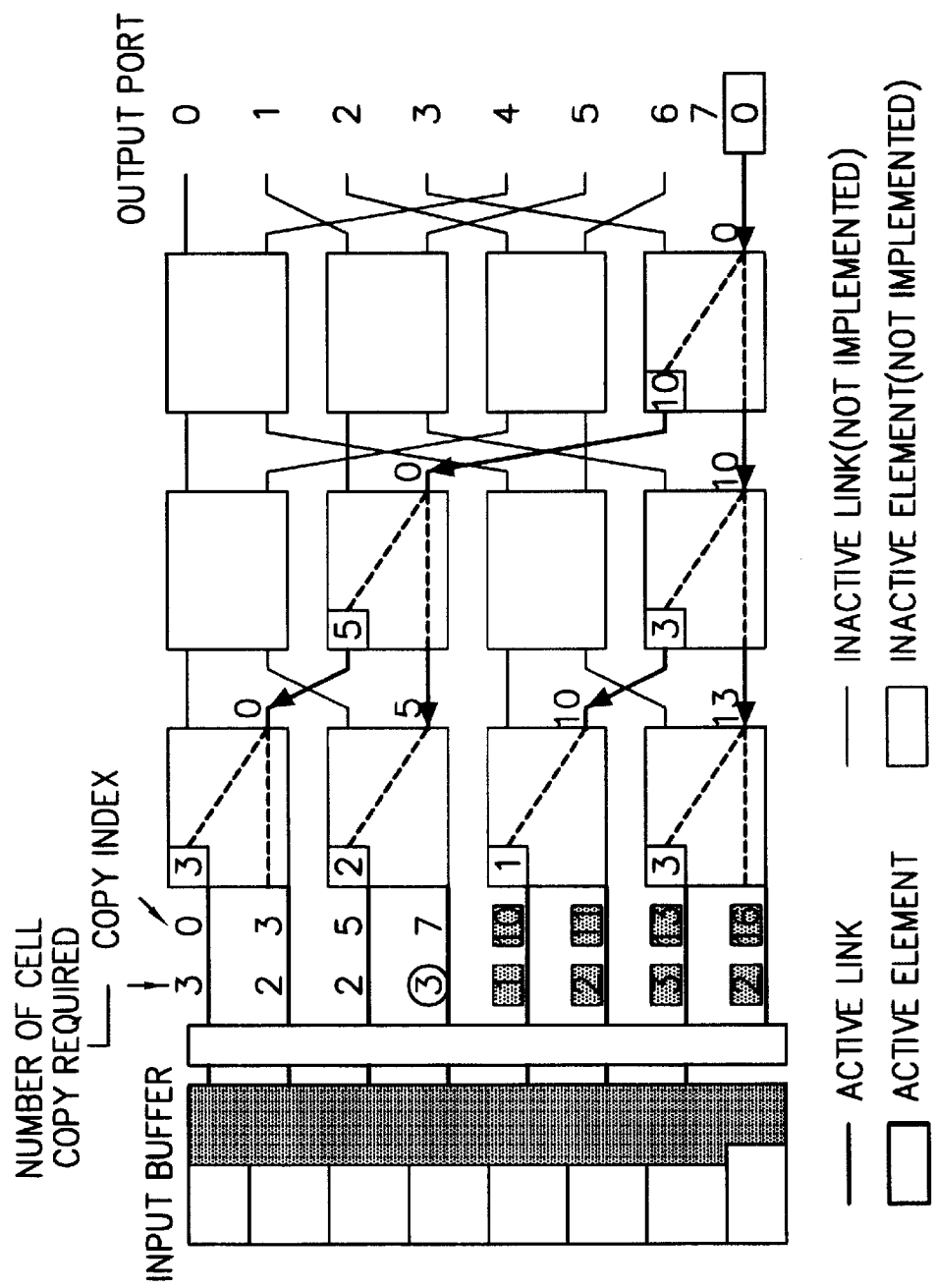
FIG. 11B illustrates the procedure of performing the second step of fetch and add function in which the copy index is transferred in the copy network, taking an example of the copy network of 8*8 volume.

FIGS. 11A and 11B illustrate an 8*8 reverse Banyan network in order to explain the fetch and add procedure in copy network 32. In FIGS. 11A and 11B, it is assumed that cells are input to eight ports when the copy index pointer is 0, and the number of cell copy required at the respective ports is 3, 2, 2, 3, 1, 2, 3, 2. Here, the number of cell copy includes itself (copy source cell). The copy index pointer indicates the number of cell fedback in the cell cycle of the preceding step, and is renewed for every cell cycle by feedback network 52. This number is a number reserved to allow the cells fedback in the cell cycle of the preceding step to pass routing networks 63a–63d primarily. The maximum number of cells copied is a number in which the reserved number of cell is subtracted from the overall number of ports.

The fetch and add function of copy network 32 is as follows. FIG. 11A illustrates the first step of fetch and add function in which the number of cells copied is summed from the input port to the output port of copy network 32. The operation of summing the number of cells copied is performed as below.

If there is a cell input to the higher input port in the first stage 2*2 element of the copy network, the copying number of cells required is written in the register of the element regardless of whether the lower input port receives a cell or not. The numbers of copied cells input to the higher and lower input ports of the first stage element are summed and sent to the lower output port. This value is input to the element connected to the second stage. Also at the second stage, the same process as at the first stage is performed with respect to the value (indicating the number of cell) input to the element. The third stage performs the same process as above. After the above procedure, the numbers of cell copy required by all the cells input are summed and output to the lowest port at the final stage. This value is not used as the pointer of the fetch and add function during the next cell cycle in copy network 32, contrary to input network 12. The copy index pointer is renewed by the value received in the feedback network for every cell cycle.

FIG. 11B illustrates the second step of the fetch and add function in which the copy index is transferred from the output port to the input port of copy network 32. The operation of transferring the copy index is performed as below.

In the third stage lowest element, the value (for instance "0") stored in the copy index pointer is added to the value written in the element register in the first step of the fetch and add process, and sent to the second stage element via the lower input port. The pointer "0" is transferred to the second stage element via the input port without change.

The second stage element transfers the value input from the third stage to the first stage element via the input port.

Through the lower input port, the value transferred is added to the value written in the element register during the first step of the fetch and add process, and sent to the first stage element.

The first stage element transfers the value received from the second stage to the higher input port, adds the value to the value written in the element register in the first step, and sends the result to the lower input port.

After the above procedure, all the cells receive the output port number of the copy network from which the finally copied cell for the respective cells is output, on basis of the number of cell copy required by itself. In FIG. 11B, the cells receive 0, 3, 5, 7, 10, 11, 13, 16, starting from the cell of the highest port.

In one cell cycle, the maximum number of cell copy is the same as the number of ports of the copy network. Therefore, in the example of FIG. 11B, eight cells only can be copied to the utmost. Accordingly, with respect to the cells input to the first, second and third ports, as many cells as required can be copied and transferred. However, for the cell input to the fourth port, only its own can be transferred, and the rest is copied and transferred during the next cell cycle. This case is called "split," in which cell copy required by one cell is performed in several cell cycles. In FIG. 11B, (3) is a cell split, and input to the highest port of copy network 32 in the next cell cycle. The cells split are stored in a split buffer, and input to the highest port of copy network 32 in the next cell cycle. This is to prevent the split cell from being, split sequentially. In FIG. 11B, the cell dotted in its copy number is input in the next cell cycle because it surpasses the maximum number of copying of copy network 32. A value in which the number of cell fedback is subtracted from the maximum number of cell copy containing the fedback cell in the preceding cell cycle is the largest capacity copiable actually in the cell cycle.

Figure 12:
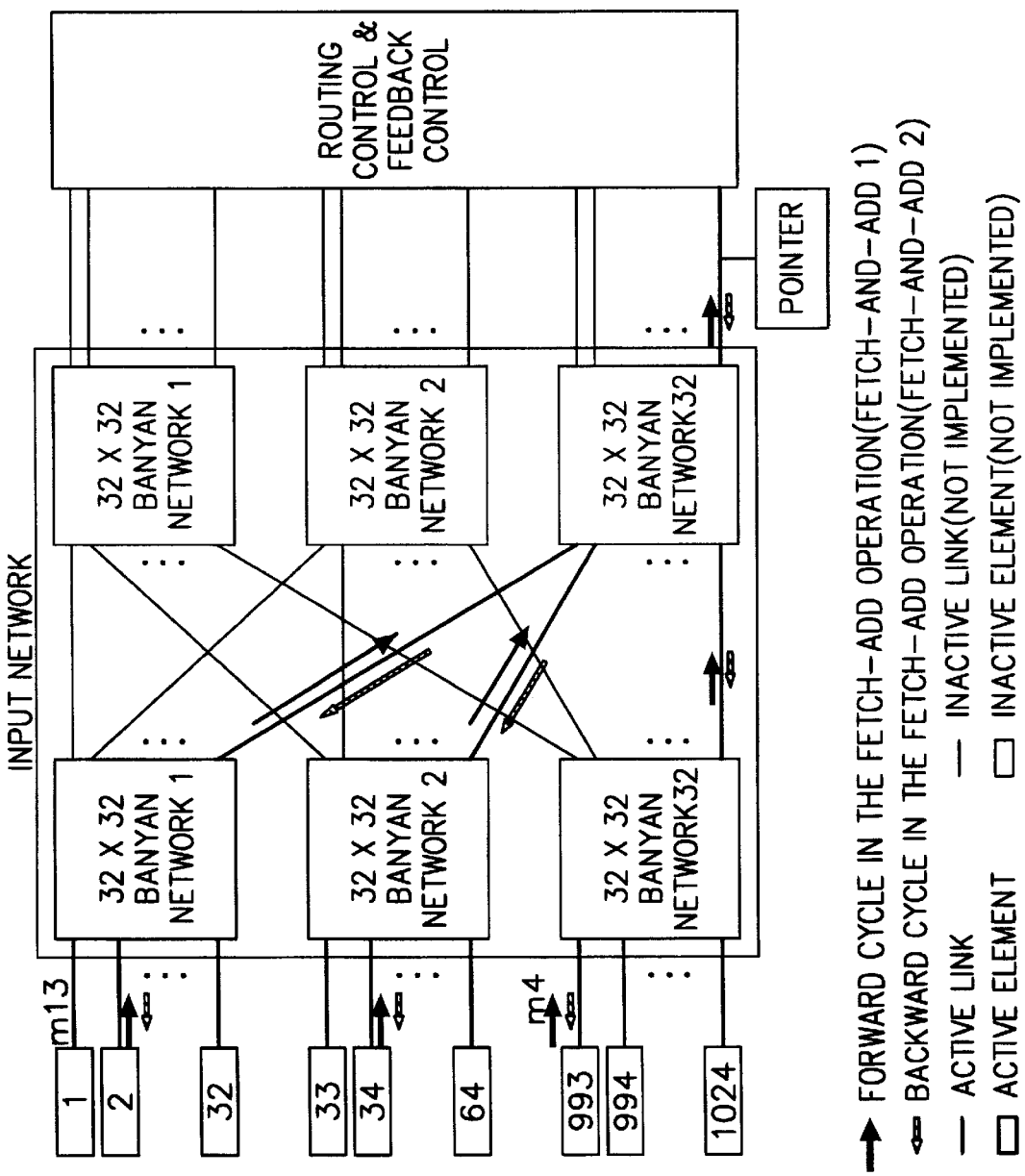
FIG. 12 illustrates the procedure of performing the fetch and add function in which the number of cell copy is added and the copy index is transferred in the copy network, taking an example of the copy network of 1,024* 1,024 volume.

As explained above, FIGS. 11A and 11B illustrate an example of 8*8 copy network 32. As in these drawings, the fetch and add function of copy network 32 performs the first step of summing the number of cells copied from the input port to the output port and the second step of transferring the copy index of the cells summed, from the output port to the input port. FIG. 12 illustrates the first and second steps of fetch and add function in copy network 32 of 1,024*1,024 volume. In FIG. 12, the solid line indicates the procedure of summing the number of cells copied, that is, the forward cycle in the fetch and add operation. The dotted line illustrates the procedure of transferring the copy index, that is, the backward cycle in the fetch and add operation.

Figure 13A:
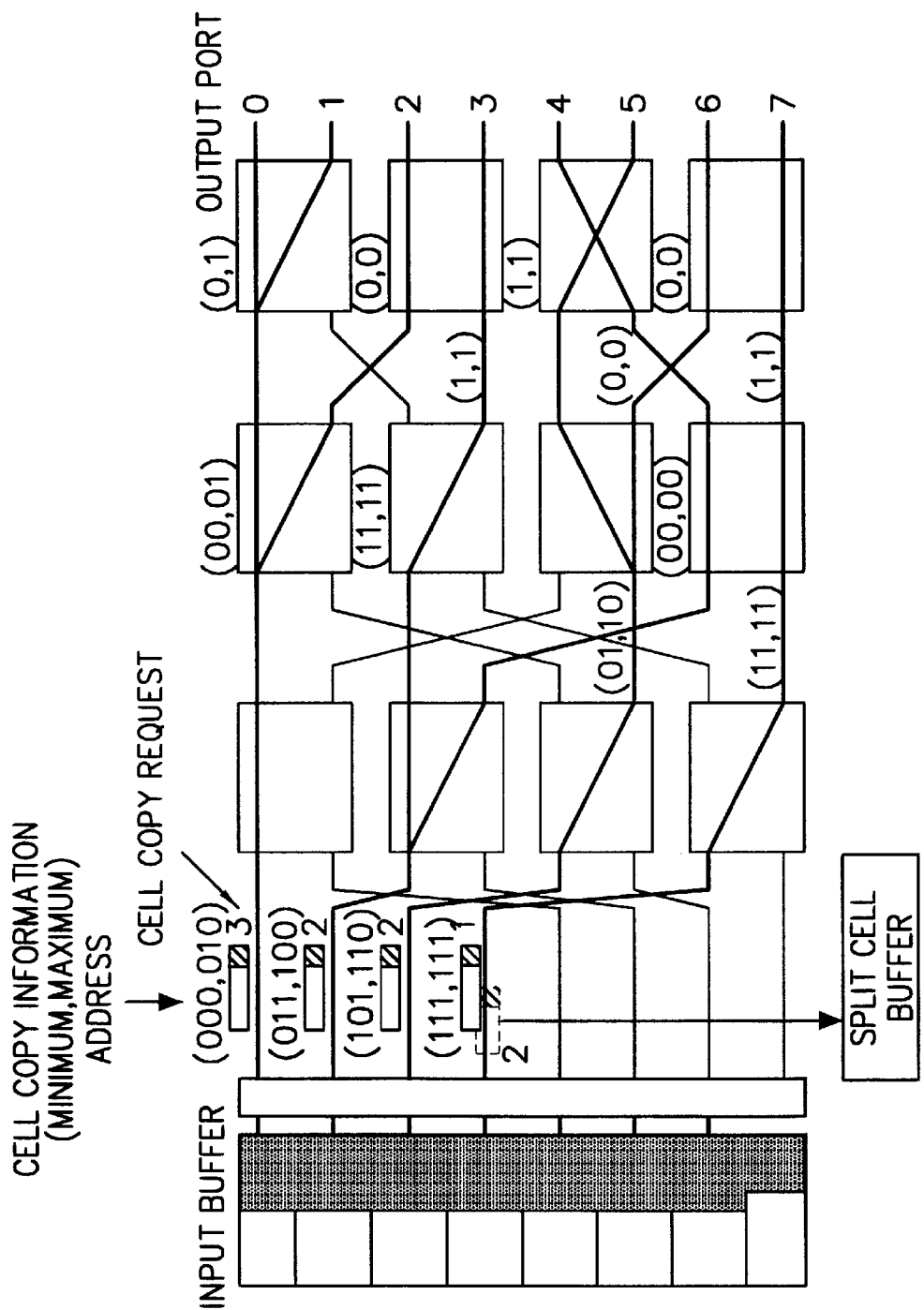
FIG. 13A is a diagram for explaining the function of copying cells after the fetch and add function in the copy network of 8*8 volume.
Figure 13B:
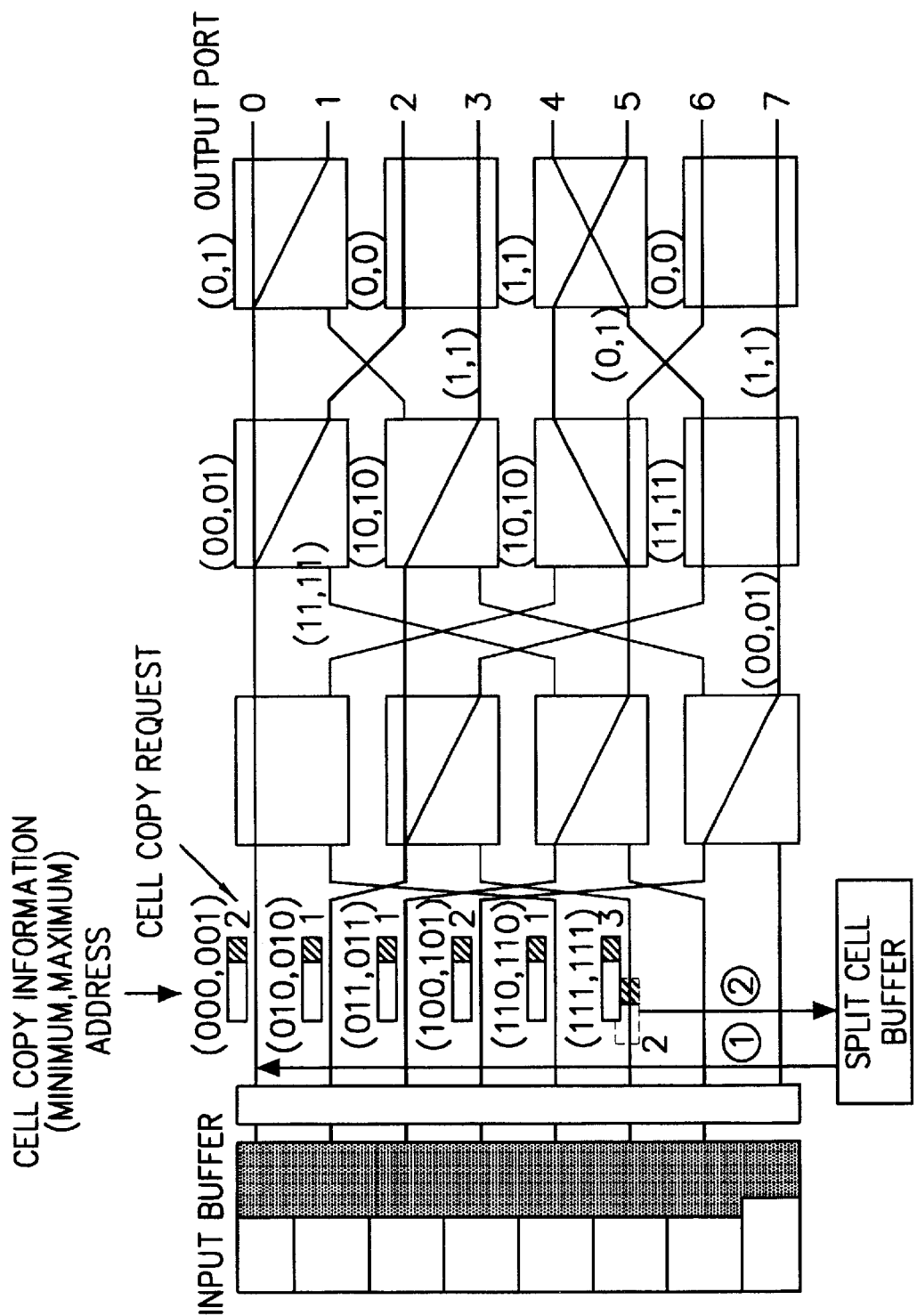
FIG. 13B illustrates a procedure of cell copy in the next step after the procedure of FIG. 13A in the copy network of 8*8 volume in order to explain the function of copying cells after the fetch and add function.

After the fetch and add function in copy network 32, the cell copy is performed. FIG. 13A illustrates the cell copy in the present (n) step of copy network 32 of 8*8 volume. FIG. 13B illustrates the cell copy of the next (n+1) step in copy network 32 of 8*8 volume.

The cell copy is to copy the cells input from copy network 32 after the fetch and add function. A value for performing cell copy in copy network 32 is calculated on basis of the copy index obtained by performing the fetch and add function. The value is calculated for the respective cells for every cell input to copy network 32, and written in the cell header. Then, the cell copy information used for the cell copy algorithm is indicated as a (minimum, maximum) value, and transferred through the cell header. Here, the copy index obtained from the fetch and add function becomes the minimum, and the value in which the number of copying is added to the copy index becomes the maximum. The copy information (minimum, maximum) is made of $\log_2 N$ bits, respectively, in case that copy network 32 is N*N. In case that copy network 32 is 1,024*1,024, the copy information requires 10 bits. With the copy information value, the cell copy performed in the 8*8 Banyan network is shown. FIG. 13A expresses the cell copy information into [(min.1, min.2, min.3), (max.1, max.2, max.3)], for the convenience of the explanation of cell copy.

As in FIG. 13A, at the first stage of copy network 32, the first bits min.1 and max.1 of cell copy information (min.1, min.2, min.3), (max.1, max.2, max.3) are compared. If they are different, the cells are copied and sent to both output ports. The output cells undergo the same process in the second stage, and the cell copy information used at the second stage is controlled as below.

cell copy information for the cells output to the higher link:(min.2, min.3), (1,1)

cell copy information for the cells output to the lower link:(0,0), (max.2, max.3)

If min.1 and max.1 are identical, the input cells are not copied, and this case is divided into two kinds whether the value is 0 or 1. Here, the cell copy information is adjusted into copy information (min.2, min.3), (max.2, max.3) both excluding the first bits.

In case of 0, the cells are transferred to the higher output link.

In case of 1, the cells are transferred to the lower output link.

At the second stage, the cells input from the first stage undergo the same process as at the first stage, and the cell copy information used at the third stage is adjusted as below.

In case that cell copy is performed, the cell copy information of the cells transferred to the higher link: (min.3,1)

In case that cell copy is performed, the cell copy information of the cells transferred to the lower link: (0, max.3)

In case of no cell copy, the cell copy information: (min.3, max.3)

At the final stage, the same process as above is performed, and as many copied cells as required are output sequentially from the highest link at the final copy network output stage.

FIG. 13B illustrates a procedure of copying the rest of the cells split in the preceding cell cycle at the highest port of copy network 32 in the next cell cycle. The split cells produced in the present cell cycle and the number of copying are stored in the split cell buffer, and then input to the highest port of copy network 32 in the next cycle for their copying. In FIG. 13B, (1) is a cell split in the preceding (n) cell cycle, and input to the highest port in the n+1 cycle. The cells split in the n+1 cell cycle like (2) are stored back in the split cell buffer.

Figure 14:
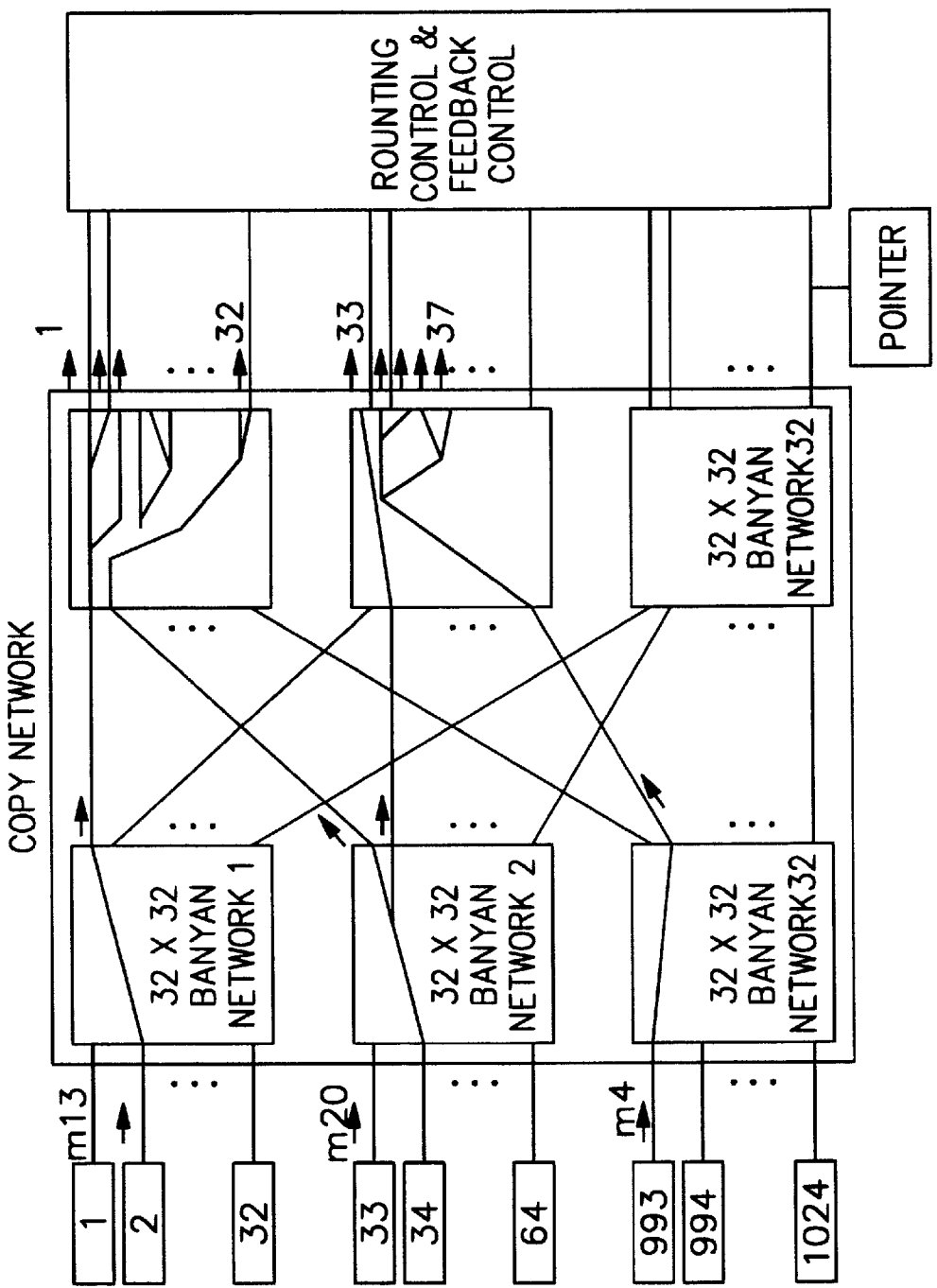
FIG. 14 illustrates a procedure of copying currently input cells in the copy network of 1,024*1,024 volume in order to explain the function of copying cells after the fetch and add function.

The cell copy of copy network 32 is performed in such a manner that the cell copy information is obtained from the copy index obtained by performing the fetch and add function, and then the cells input from the cell copy information are copied. FIG. 14 illustrates the operation of copying the cells in copy network 32 when a copy network 32 of 1,024*1,024 volume is formed.

Figure 15:
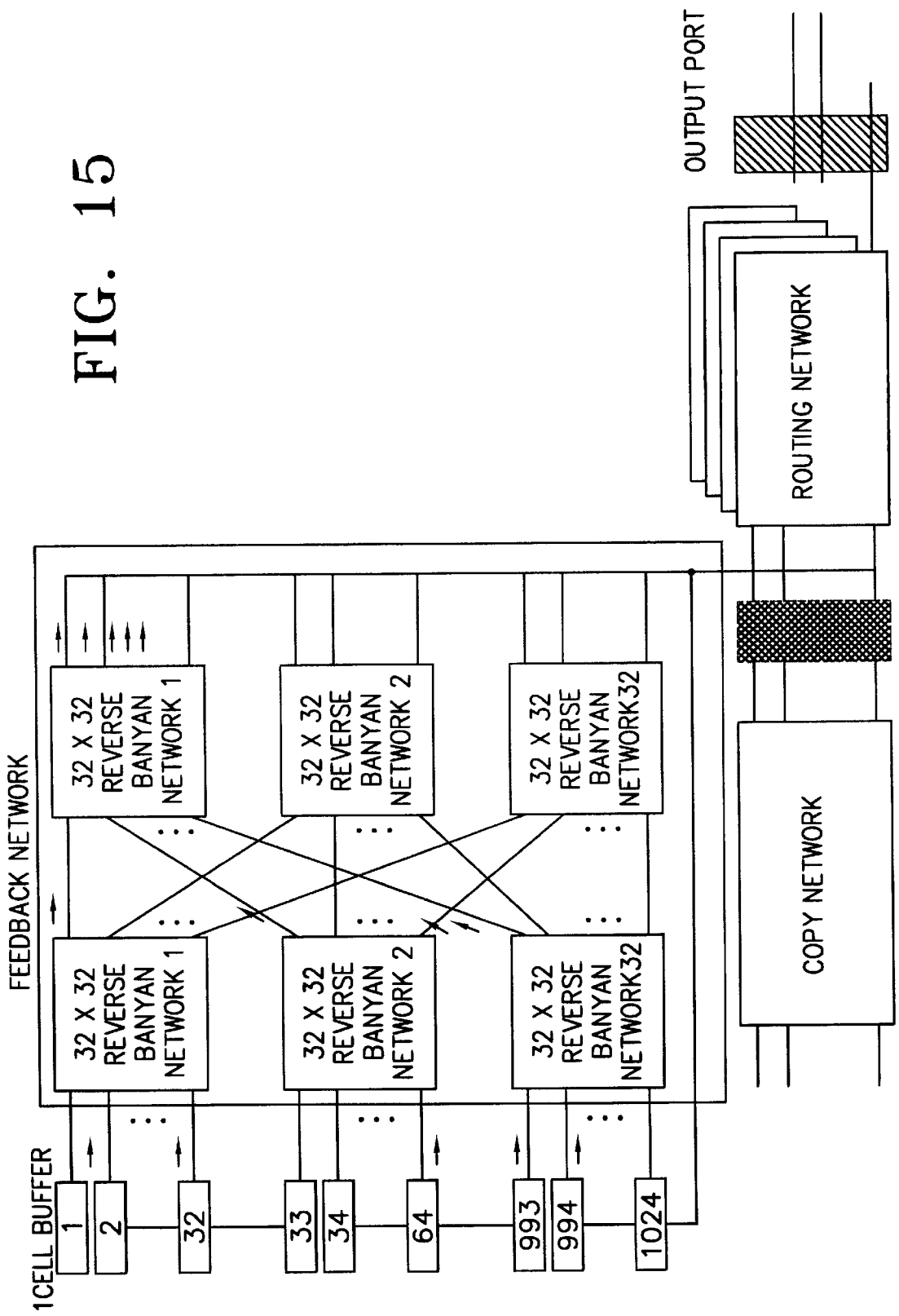
FIG. 15 illustrates a configuration of the feedback network of 1,024*1,024 volume in FIG. 6.

Feedback network 52 is formed with the same hardware as that of input network 12. FIG. 15 illustrates feedback network 52 of 1.024*1,024 volume. Feedback network 52 stores input cells in a feedback buffer of one cell size for every port located at the front stage for one cell cycle, and outputs the cells sequentially from the higher output port of feedback network 52 without room, as shown in FIG. 15. This is to increase the transfer priority when the cells passing feedback network 52 are input to routing networks 63a–63d in the next cell cycle. This process is the same as the fetch and add function and cell transfer in input network 12. In feedback network 52, the buffer pointer in the fetch and add function starts always from 0 for every cell cycle. Here, the cells to be fedback are selected by the feedback controller of routing/feedback controller 41 for every cell cycle. The information on feedback is calculated for every cell cycle according to the feedback control function. When the feedback control is performed in routing/feedback controller 41, only cells which will not cause loss due to output port contention are input to routing networks 63a–63d. Feedback network 52 offers the pointer used in the fetch and add function of copy network 32 for every cell cycle.

Figure 17A:
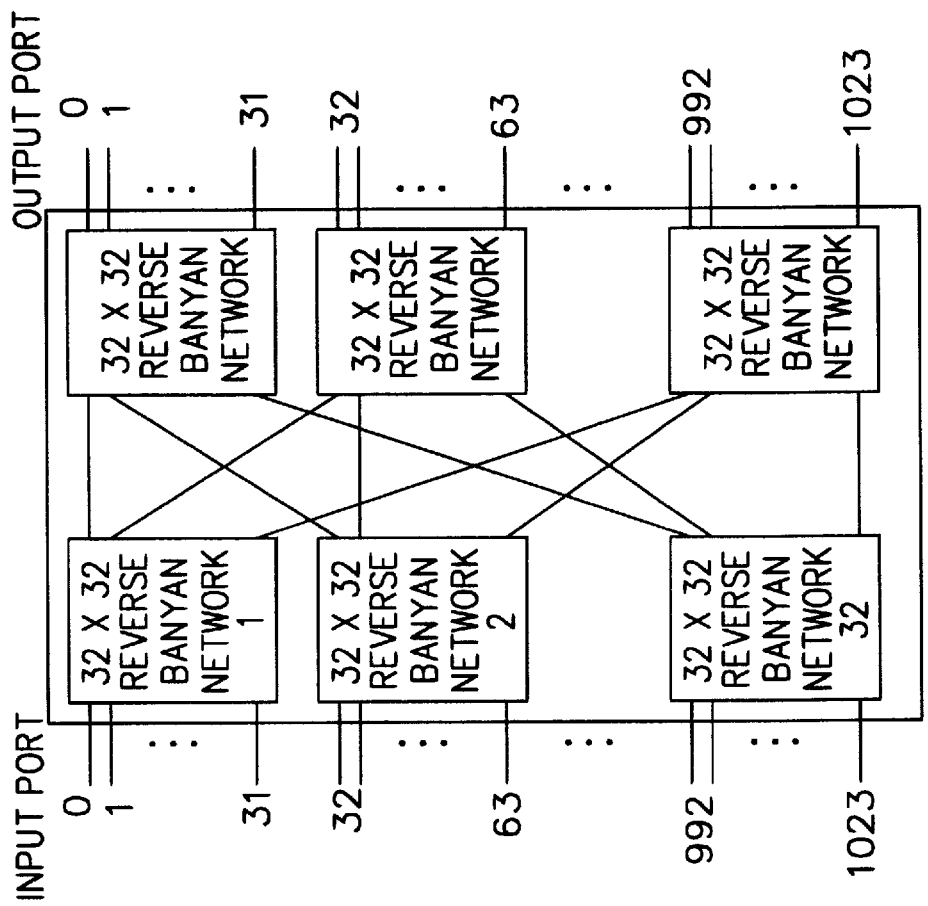
FIG. 17A illustrates an example of the routing networks formed in Banyan type.
Figure 17B:
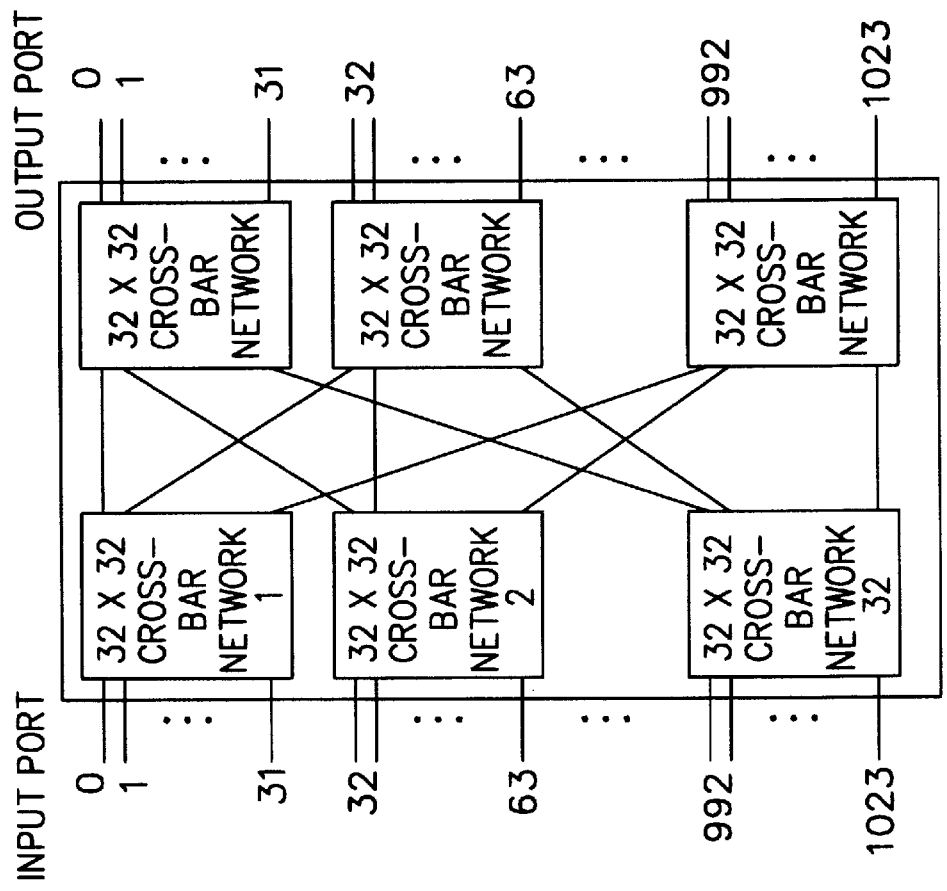
FIG. 17B illustrates an example of the routing networks in the crossbar type constructed according to the principles of the present invention.

Routing network 63 is implemented in plurality in order to prevent output port contention. In this invention, it is assumed that 1,024*1,024 network having 32*32 X-bar networks at two stages is made with four parallel-connected routing networks 63a–63d. If the crossbar (X-bar) network is used for the routing network 63, it is very efficient in switch performance though the amount of hardware used for the unit switch becomes larger than for the Banyan network. Therefore, the crossbar network is used for the routing network 63. FIG. 17A illustrates an example of routing network 63 made with the Banyan networks. FIG. 17B illustrates an example of routing network 63 made with the crossbar networks. The following table 1 expresses the difference between the cases in which the routing network is made with the Banyan network or crossbar network. If the 1,024*1,024 network is formed using the unit switches of 32*32 volume, as shown in FIGS. 17A and 17B, the unit switches have the conceptually same structure in both cases, other than internal structure and performance.

TABLE 1

| mode items | Banyan type | X-bar type | Remarks |
|---|---|---|---|
| unit device | 32 × 32 Banyan network | 32 × 32 crossbar network | |
| unit device's performance | blocking | non-blocking | |
| unit device's complexity | 320 crosspoints, $(Nlog_2 N) \times 2^2$ | 1,024 crosspoint, $(N^2)$ | N: the number of port |
| unit device single chip | OK | OK | |
| shuffle between unit devices | full shuffle | full shuffle | |
| routing mode | self-routing | self-routing | |
| routing net multiple number (1,024*1,024) | 4 planes | 4 planes | |
| switch performance (1,024*1,024) | up to 85% | up to 99.9% | -under burst traffic -HOL BL soft application |
| others | input network application | unit switch for routing network is required | |

Figure 16:
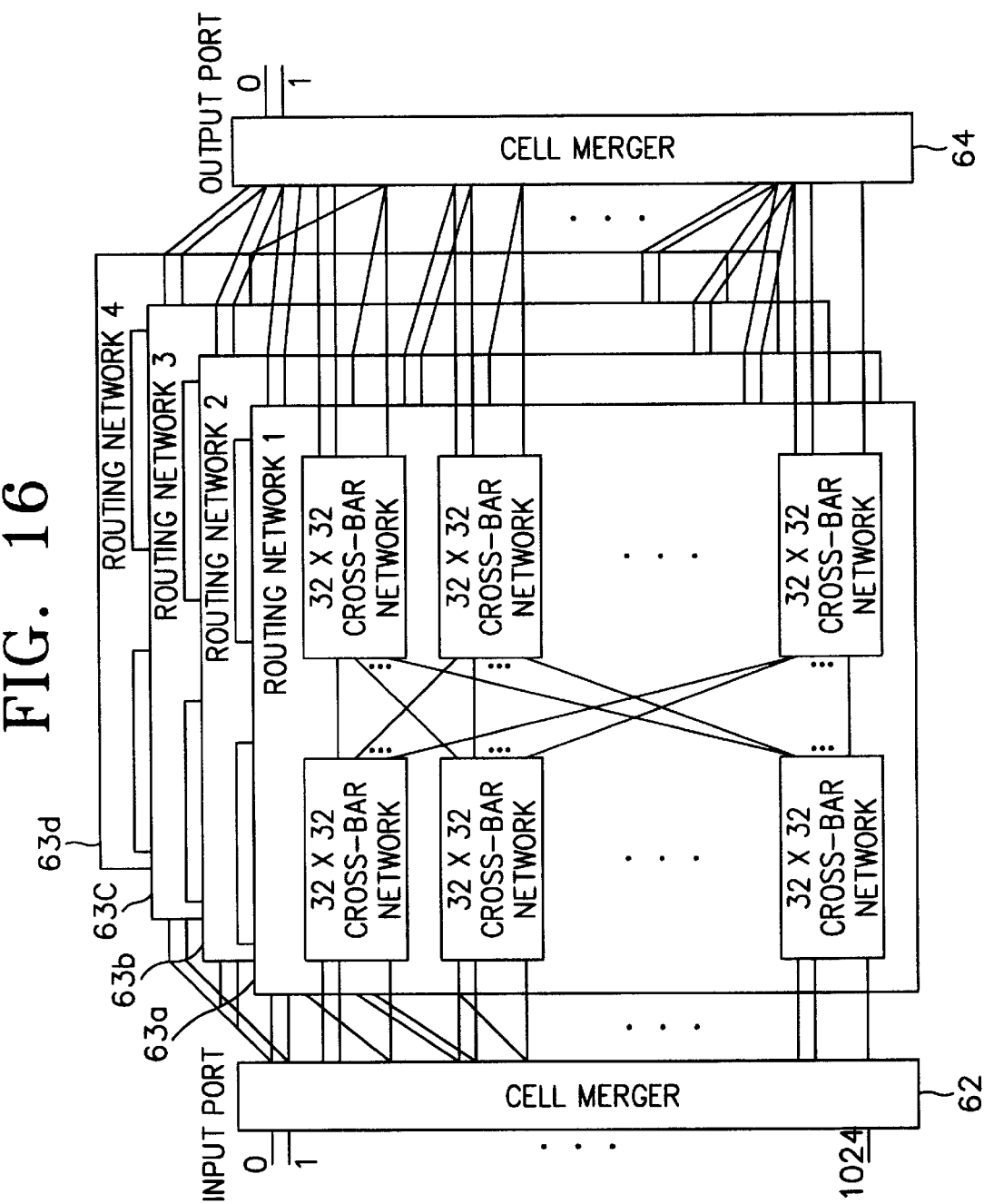
FIG. 16 illustrates a configuration of four parallel routing networks in FIG. 6.

In this invention, it is assumed that the routing network 63 of 1,024*1,024 is formed as shown in FIG. 16, and that four routing networks are used in order to increase the performance of the ATM switch network. According to the result of simulation using routing networks 63a–63d as shown in FIG. 16, it is noted that the cell processing throughput is 95% and approximates 100% in case that the internal blocking and output port contention control of routing networks 63 are performed along with the control of input buffer 20 and output buffer (not shown).

If routing networks 63 are formed in plurality in parallel, cell splitting and cell merging must be performed together as well as the routing. For this, cell splitter 62 and cell merger 64 are used together. Cell splitter 62 is used to distribute cells to routing networks 63a–63d, and cell merger 64 merges the cells reaching the respective output port from routing networks 63a–63d.

Figure 18:
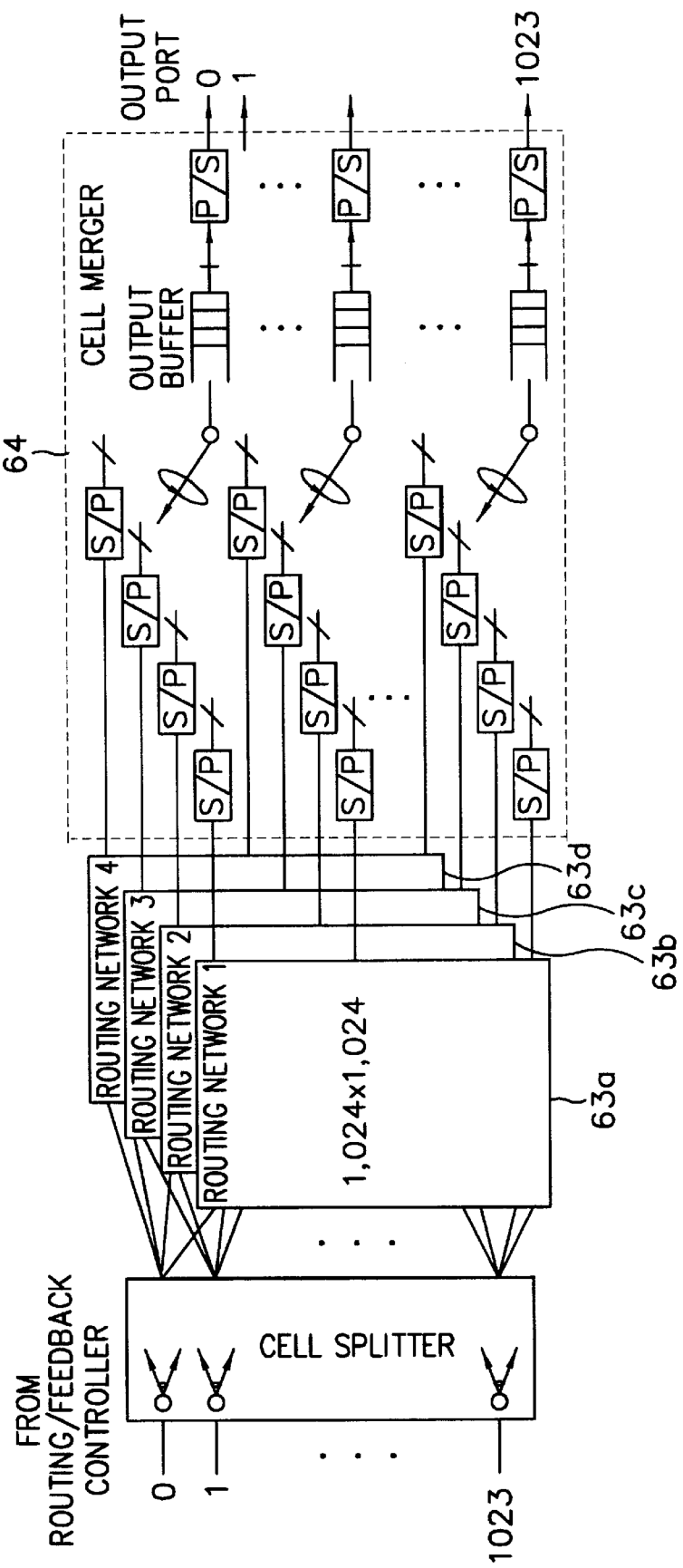
FIG. 18 illustrates the structure of the cell splitter, routing networks and cell merger according to the present invention.

The routing will be explained below with the related entire structure. FIG. 18 illustrates the configuration of cell splitter 62 and cell merger 64 with routing networks 63a–63d. The cells undergoing internal blocking control and output port contention control by the routing controller in the routing/feedback controller 41 are split by cell splitter 62 and transferred to routing networks 63a–63d. Here, the cells are distributed to the four routing networks sequentially according to the internal blocking and output port contention control of routing 63a–63d. The input cells are self-routed to the output ports of routing networks 63a–63d, and the multiple cells transferred to the same output port of routing networks 63a–63d are stored in the output buffer of cell merger 64, and then output sequentially.

Cell splitter 62 distributes the cells input to the respective ports to routing networks 63a–63d as shown in FIG. 18 so that they are transferred without internal blocking and output port contention. The cell splitting information is obtained from the output port contention prevention and routing network internal blocking prevention.

Cell merger 64 stores the multiple cells output to the same port of routing networks 63a–63d to the output buffer of cell merger 64, as shown in FIG. 18, and then transfers them sequentially. The cells output from routing networks 63a–63d are stored in the output buffer by a selector for sequentially selecting active cells after their serial/parallel conversion. Here, active cells mean that they are actually transferred to the output port. The serial/parallel conversion is performed to reduce the hardware's driving speed. The cells output from routing networks 63a–63d are serial data of 160 Mb/s and their speed must increase when they are output at the same time. However, at present, its implementation is hard with the current hardware.

The routing/feedback controller 41's routing control will be described below with reference to the routing table. The routing control includes the routing tag adding and cell header conversion. The routing tag is used to transfer all the cells to their respective output ports via routing networks 63a–63d. Here, the routing tag is obtained from routing related information such as routing table 42 by using virtual path identifier (VPI)/virtual channel identifier (VCI), and input port identifier. The routing tag information stored in routing table 42 is renewed by the call/connection control processor of FIG. 5 whenever a call is requested, and must perform routing control 1,024/n cells within one cell cycle at the same time.

The cell header conversion is to convert the cells routed and transferred to other node via the ATM switch network into information used in routing at other node. This information contains cell header's VPI/VCI, payload type identifier (PTI), and cell loss priority (CLP).

Figure 19:
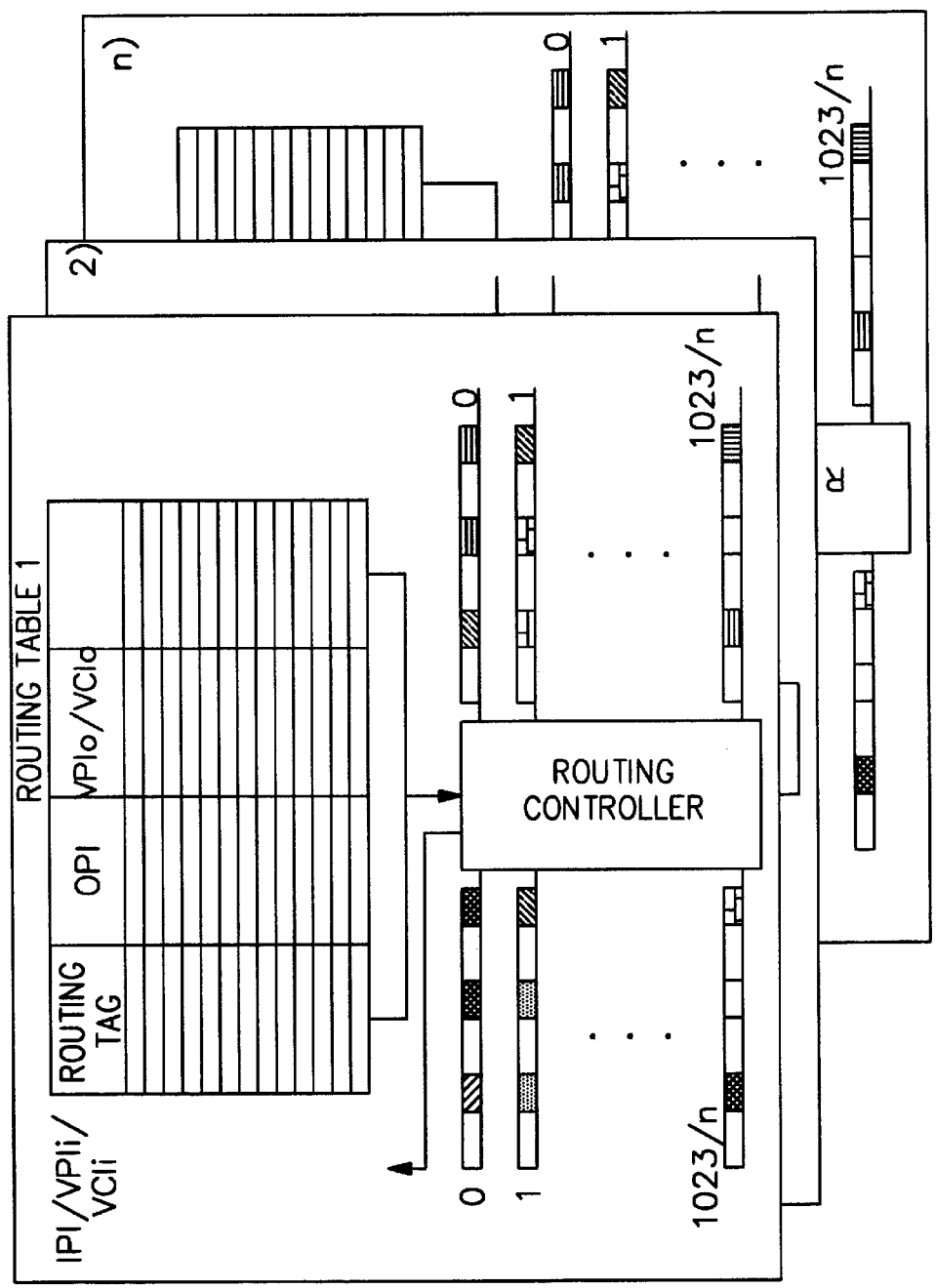
FIG. 19 illustrates the structure of the routing table of FIG. 6 and cell header conversion.

From now on, routing table 42 and cell format will be described. Routing table 42 is used to store the cell routing information, which is stored in routing table 42 by the call/connection control processor of FIG. 5 whenever call/connection is set, and its state is maintained until its release. Routing table 42 has a structure shown in FIG. 19. As shown in FIG. 19, routing table 42 consists of routing tag and cell header conversion information for the respective cells. The cells' routing tag is found with reference to the cell header's unicast connection ID (VPI/VCI), multicast connection ID, and copying order number. The specific structure and contents of routing table 42 should be studied more along with the structure and function of the cell header used inside the ATM switch network, and a specific routing mode.

Figure 20A:
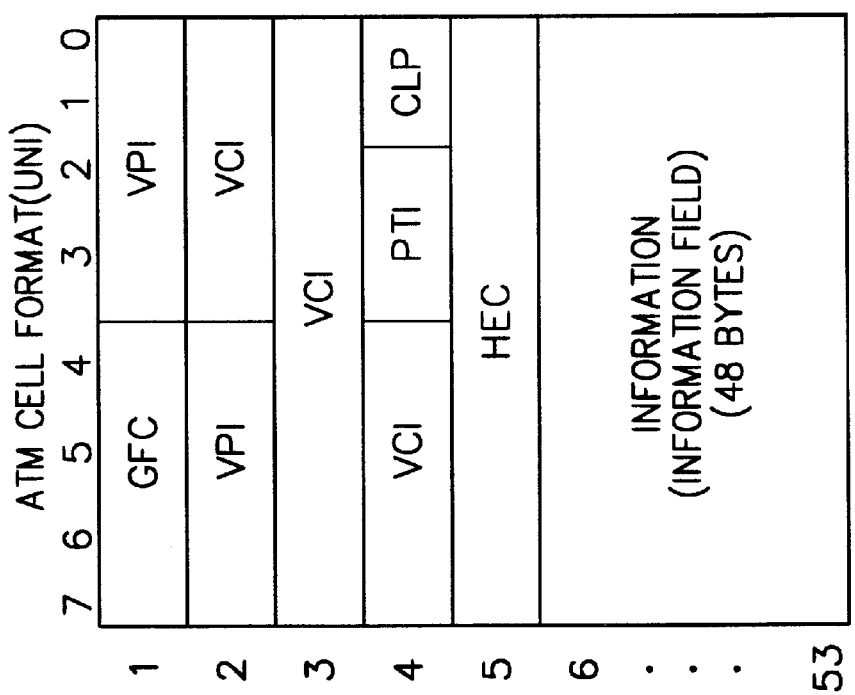
FIG. 20A illustrates the structure of cell header in the ATM UNI.
Figure 20B:
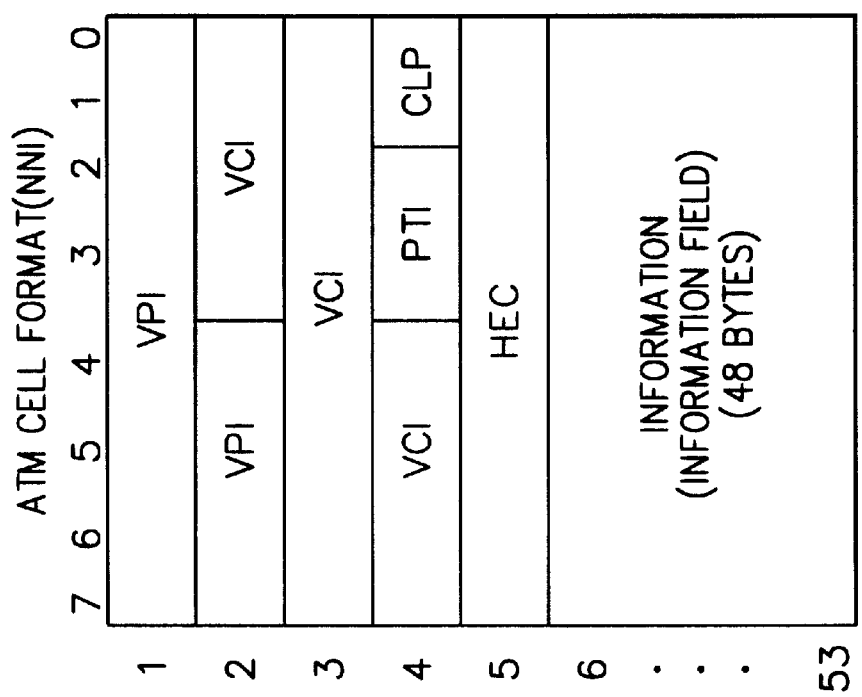
FIG. 20B illustrates the structure of the cell header in the ATM NNI.

The structure of cell header used in the switching system of ATM switch network is formed as in FIGS. 20A and 20B. Here, FIG. 20A illustrates the cell header in ATM user-network interface (UNI). FIG. 20B illustrates the cell header in the ATM network node interface (NNI).

This invention suggests that the structure of cell header of the ATM switch network is used in the structure of FIG. 21. In the structure of cell header shown in FIG. 21, A is an area for storing one bit indicative of whether a cell is active or inactive. S/M/B (singlecast/multicast/broadcast) is, formed with two bits, an area for storing bits indicative of singlecast, multicast and broadcast services. Copy info., formed with 20 bits, is an area for storing cell copy information indicative of the minimum and maximum address required for a cell copy. MCN (multicast copy number), formed with 10 bits, is an area for storing information indicative of the number of cells copied. IPI/SRT (input port ID/self-routing tag), formed with 10 bits, is an area for storing information to identify the input port of the switch network to which the cells are input, and to offer the routing tag after routing control. VPI, eight bits, is an area for storing virtual path identification information. VCI, 16 bits, is an area for storing virtual channel identification information. PTI, three bits, is an area for storing payload type identification information. CLP, one bit, is an area for storing cell loss priority information. HEC (header error control), eight bits, is an area for storing head error control information.

With FIG. 21, various kinds of information added in the cell header used in the internal switch network and their functions will be explained.

First, bit A indicates whether the cell is active or inactive. SMB indicates to which service the cell belongs among singlecast, multicast and broadcast. Copy info. field indicates information (min,max address) required in cell copy. MCN is used to distinguish the multiple cells copied. The cells copied are distinguished to allow their respective routing controls to be performed because they are transferred to different destinations. IPI/SRT is a field to identify the input port of switch network to which the cells are input, and to provide a routing tag after routing control. The cell header used in the switch and shown in FIGS. 20A and 20B and various standard cell header conversion functions are performed in the ATM UNI and ATM NNI interface.

The internal blocking prevention and output port contention prevention of routing networks 63 will be described below. These functions are performed by routing/feedback controller 41. Basically, the two functions are preferably performed, but one of them may be selectively used according to the switch network's performance requirement. Specifically, only the internal blocking prevention or output port contention prevention may be selected, or both functions may be used. However, for better performance, the two functions both should be performed. This is because the switch performance is reduced without internal blocking of routing network 63 even if multiple routing networks are used and output port contention control is performed, and also with the output port contention even if the routing network's internal blocking is prevented. In this invention, the two kinds of function are performed together. Routing networks 63' internal blocking prevention is performed first, and then the output port contention prevention is performed using the result. Prior to the output port contention prevention, the routing network's internal blocking is eliminated.

The feedback controller of routing/feedback controller 41 calculates the number of cells undergoing routing network internal block and output port contention prior to one cell cycle. If the value surpasses the number of cells that can pass without internal block or output port contention within one cell cycle, the number of cells surpassed is fed back to feedback network 52, not input to routing networks 63. The cells transferred to feedback network 52 compete back with the cells input to routing networks 63 in the next cell cycle after delay of one cell cycle in feedback network 52. Here, it is controlled so that the fedback cells are transferred primarily, in order to preserve the cell transfer order within the virtual connection for ATM service. The priority control is performed so that the cells input to the higher ports of routing networks 63 have priority. According to the function, the cells allowed to be transferred to routing networks 63 are transferred to cell splitter 62, and the cells are dispersed to routing networks 63a–63d. The respective functions will be explained in detail as below.

First of all, the internal blocking prevention of routing networks 63 will be described. The routing networks 63 are not non-blocking networks because the 1,024*1,024 routing networks 63 are formed at two stage with 32*32 X-bar unit switches. This deteriorates switch performance due to the internal blocking of routing networks 63, and requires a function of preventing the internal blocking of routing networks 63.

Figure 22A:
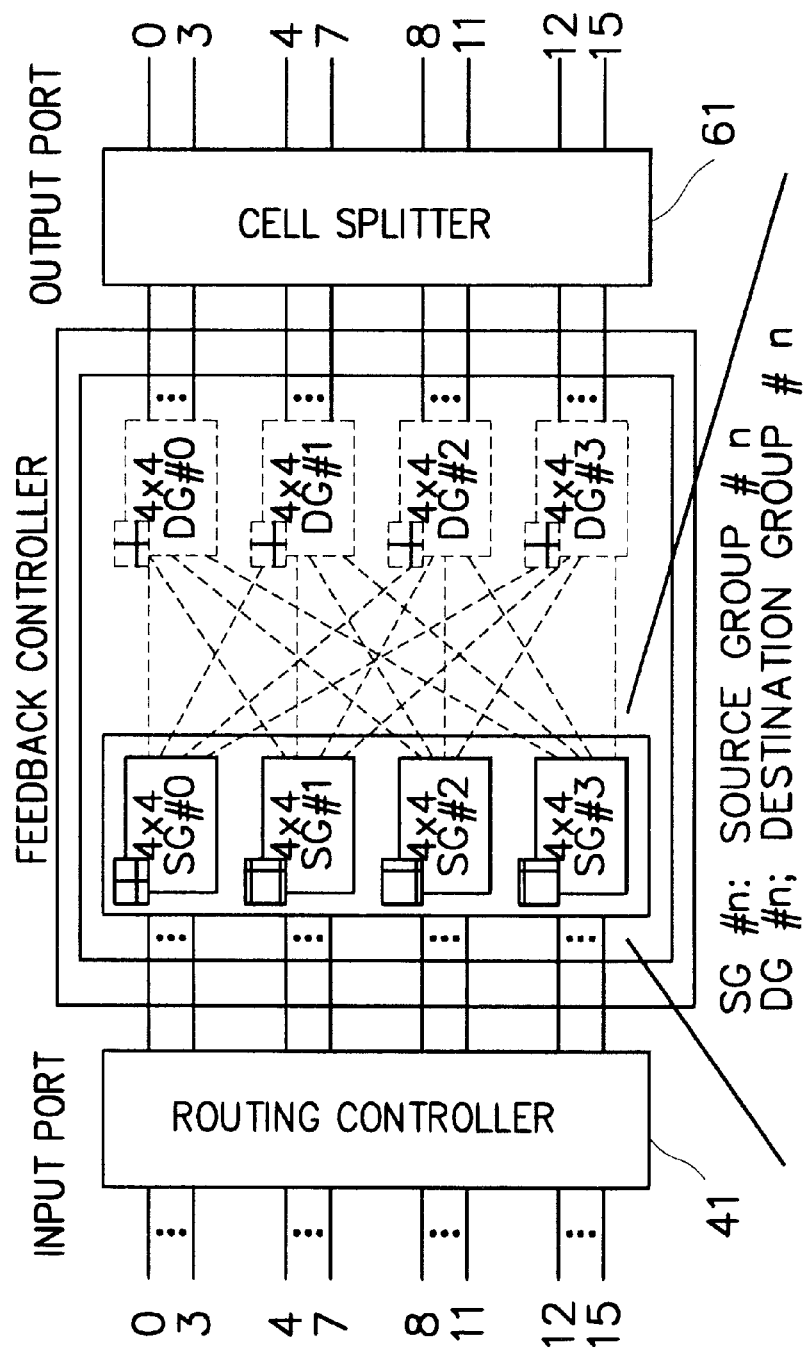
FIG. 22A illustrates the function of preventing internal blocking of the routing networks, taking an example of 16*16 routing network.

In FIG. 22A, two routing networks 63 are formed in parallel for the 16*16 routing networks 63 having 4*4 unit switches. In this drawing, the element located at the first stage is designated a source group (SG), the destination element located at the second stage being a destination group (DG).

Figure 22B:
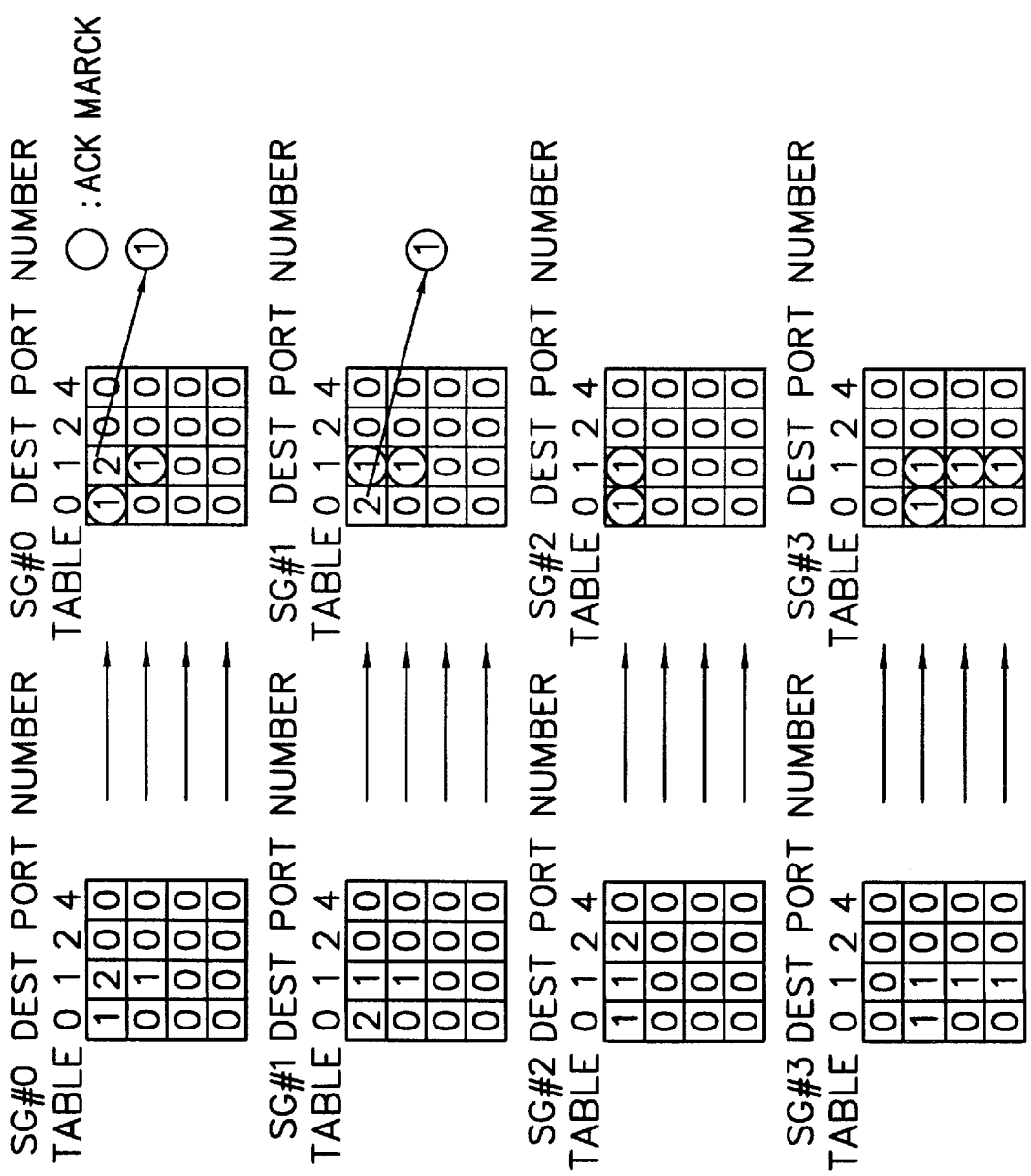
FIG. 22B illustrates the procedure of preventing the internal blocking in FIG. 22A.

For the internal blocking prevention, a table for storing which output port the cells require is necessary for the respective switch elements. This table is divided into areas corresponding to the respective destination elements. The divided areas are segmented again into areas corresponding to the number of output ports. FIG. 22B illustrates the procedure of performing the internal blocking prevention when the routing networks 63 are formed as in FIG. 22A.

Referring to FIG. 22B, the procedure of preventing internal blocking will be explained. In the switch element (SG) of the first stage, the location of the output ports required by the input cells is divided into destination group and output port number, which are written in the table.

In case that the cells requiring the same DG for the respective rows of the table surpasses two, only two are given input permission (ack) starting from the first cell of the respective rows, and the rest are not given the input permission. After this function, as many cells as permitted are input to routing networks 63, and distributed to routing networks 63a–63d by cell splitter 62.

From now on, the function of preventing the output port contention will be explained.

Figure 23:
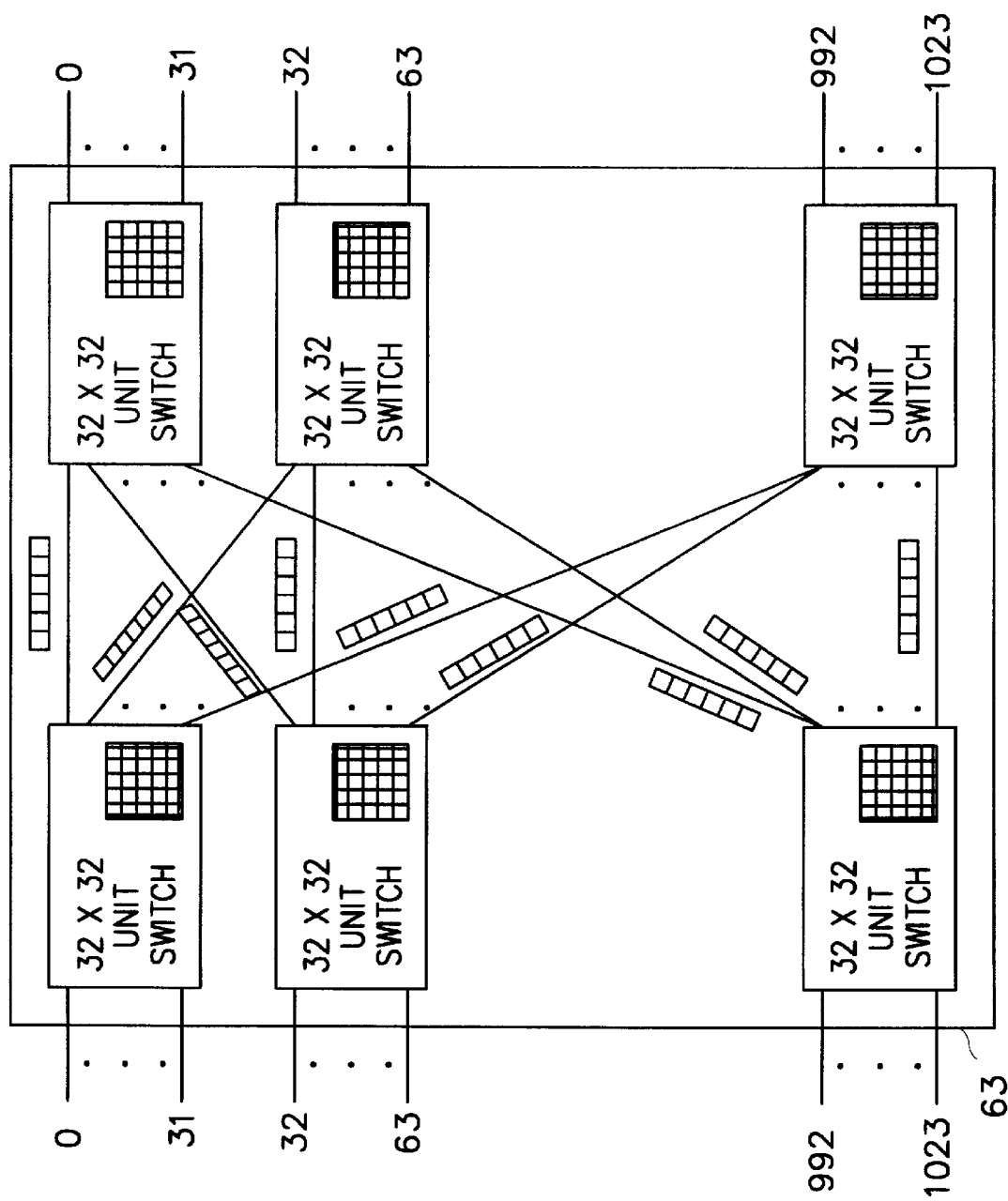
FIG. 23 illustrates the function of preventing output port contention in the routing networks, taking an example of 1,024*1,024 routing network.

If multiple cells requiring the same output port of the routing networks 63 are present in the same cell cycle, these cells collide at the output port, and causes cell loss. In order to prevent this, the output port contention prevention must be performed prior to the cells' input to routine networks 63. The ATM switch network of the present invention use four routing networks 63a–63d so that four cells reach the same output port at the same time in case of no internal blocking in routing networks 63a–63d. FIG. 23 illustrates the concept of controlling the output port contention in the routing networks 63 of 1,024*1,024 volume. As shown in FIG. 23, the output port contention has the conceptually same function and structure as the internal blocking prevention of routing networks 63.

Figure 24A:
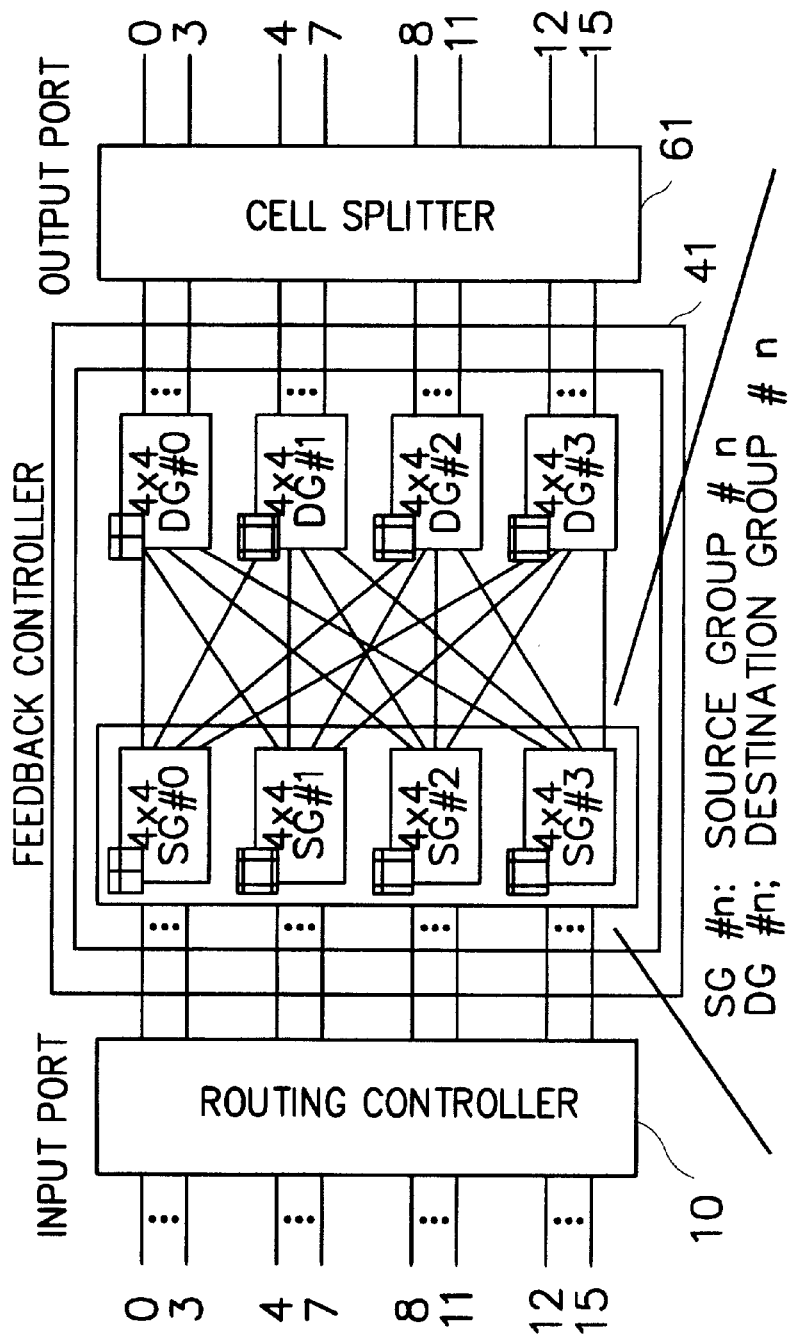
FIG. 24A illustrates the function of preventing output port contention in the routing networks, taking an example of 16*16 routing network.
Figure 24B:
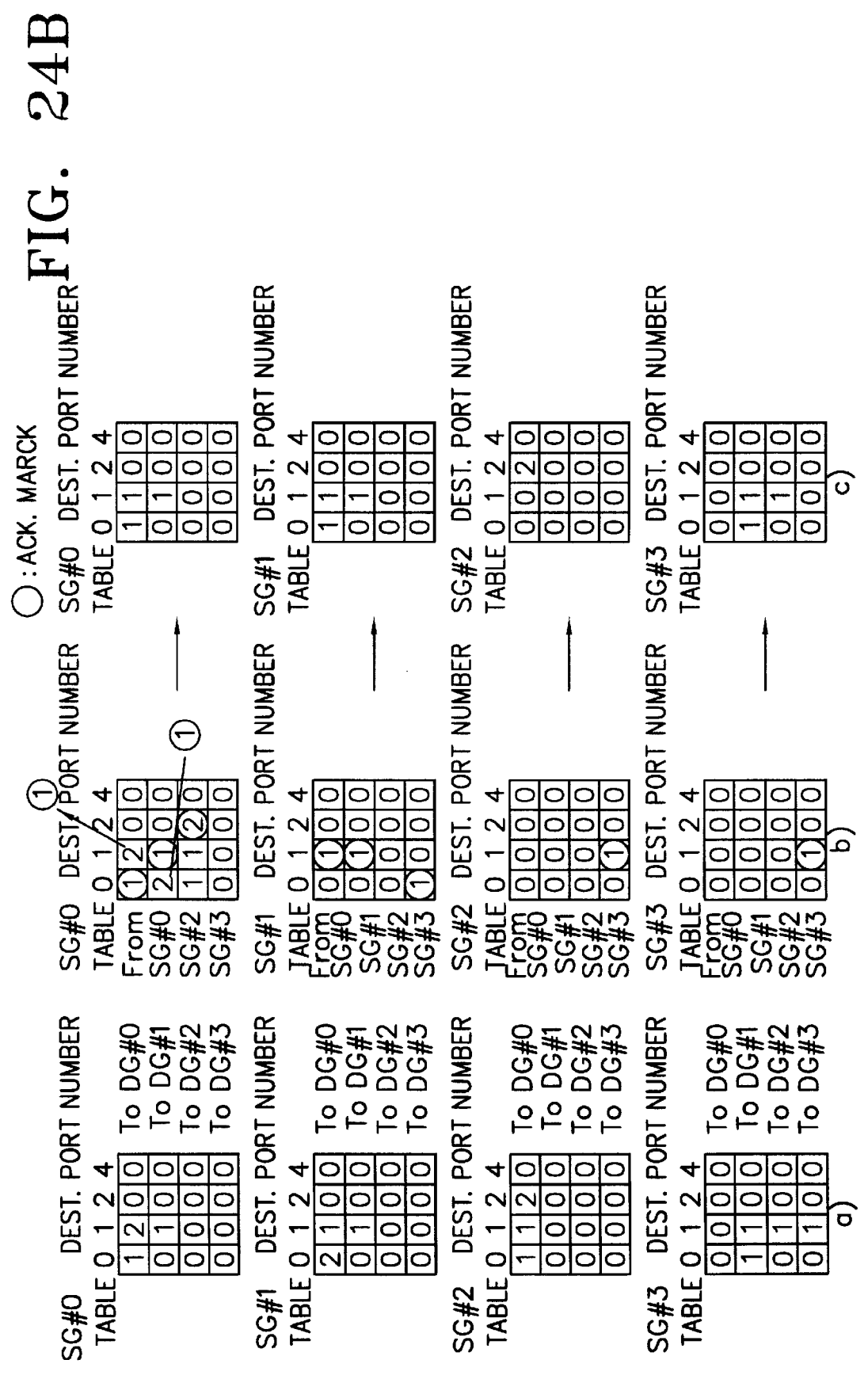

FIGS. 24A and 24B exemplify the 16*16 routing networks 63 using 4*4 unit switches for the function of calculating the number of output port contention cells. In case that routing networks 63 are used as in FIG. 24A, two cells may be transferred to the same output port at the same time. In the example of FIG. 24A, the result of internal blocking prevention of routing networks 63 obtained as in FIGS. 22A and 22B is not used in calculating the number of output port contention number of cells.

Referring to FIGS. 24A and 24B, the process of calculating the output port contention number of cell is divided into three steps.

The first step is performed in the SG element. The first stage unit switch elements are written in the table while the output ports required by the input cells are indicated by the destination element and output port number. At the first stage element, the output port destination written in the table is transferred to the corresponding destination element.

The second step is performed in the DG element. In the destination element, four values received from the first stage elements are stored in its own table. The number of cells requiring the output to the same port should not surpass a limited number (in FIG. 24A two at maximum), which is controlled in four steps.

At the first row of the table, the number of cells is summed, and input permission is indicated until the value of summing result does not surpass two. If the output request to a specific port is at least two and only one of them can be output, it is changed into 1, and indicated with input permission (first step).

At the second row, the number of input permission at the first row is summed for every output port area (the respective columns of the table), and the input permission is indicated until the value of summing does not surpass 2 (second step).

At the third row, the two steps are performed for the first and second rows (third step).

At the fourth row, the two steps are performed for the first, second and third rows (fourth step).

After the four steps, the result is transferred to the corresponding SG. The first row of the calculation result is sent to SG1, the second row to SG2, the third row to SG3, and the fourth row to SG4. The third step is performed in the SG element.

The SG receiving the result from the destination element allows as many cells as permitted to be input to routing networks 63 among the cells requiring the same output port, and the rest cells is input to feedback network 52.

From now on, cell splitting will be explained as follows. When the internal blocking and output port contention preventions are performed, the cells input to routing networks 63 are controlled by using the result, the cells permitted to routing networks 63 are dispersed by cell splitter 62 so as not to cause internal blocking and output port contention. With respect to the cells input to the respective ports of routing networks 63, as many cells as the parallel number of routing networks 63 are input-permitted, among the cells where the internal blocking and output port contention occur. Only for the cells corresponding to the number of cells input-permitted, they are distributed sequentially to the routing networks 63a–63d.

Figure 25:
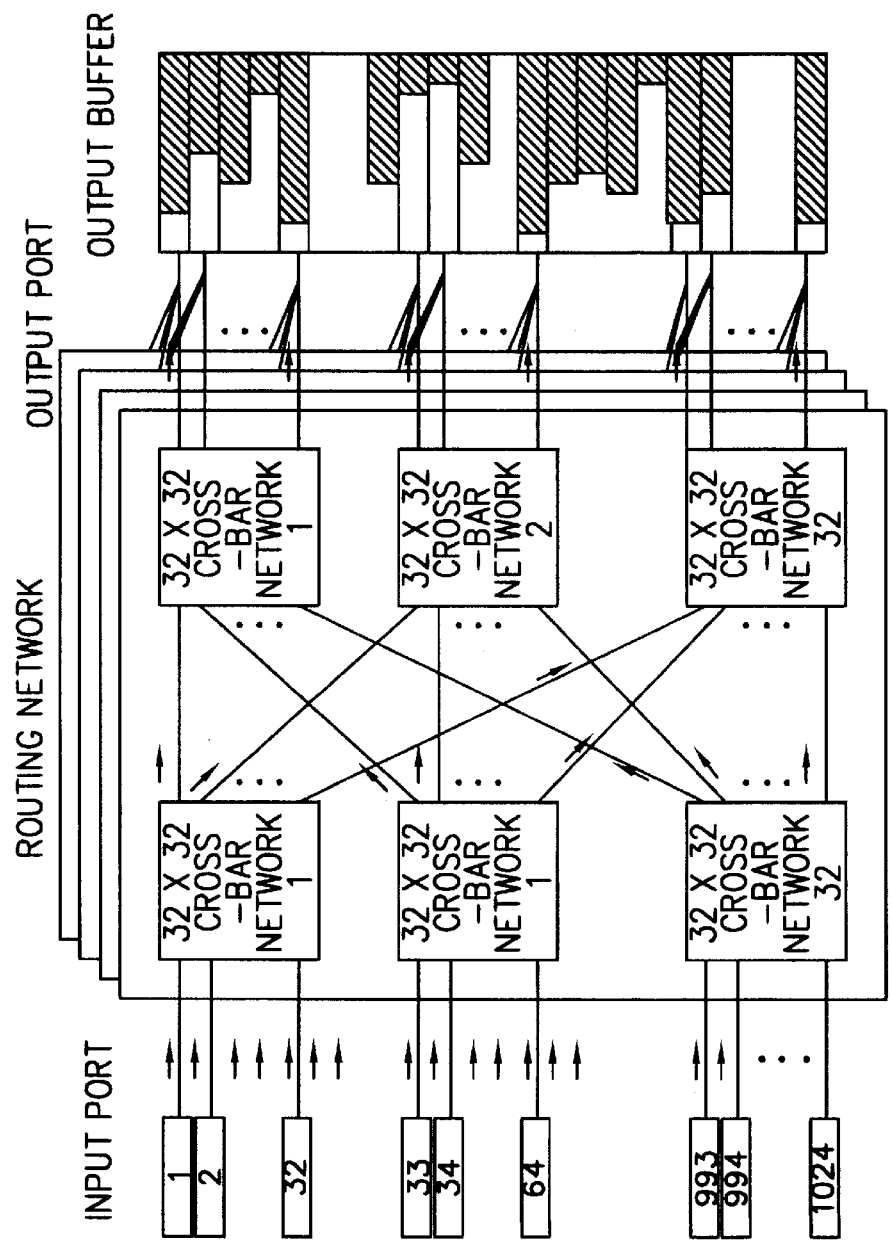
FIG. 25 illustrates the procedure of storing cells in the output buffer through the routine networks, taking an example of 1,024*1,024 routing network.

FIG. 25 illustrates the procedure of storing the cells output from routing networks 63 in the output buffer. The function of the output buffer will be described with reference to FIG. 25.

The output buffer is used to receive the cells output from the same port of routing networks 63a–63d in the same cell cycle at the same time. An exclusive buffer is allocated for every output port. For this reason, this buffer has a usage efficiency lower than that of input buffer 20 shared by all the ports.

The structure of the unit switches will be described below. The space-divided switch network like the ATM switch network of the present invention sharply increases the amount of hardware as the volume of the switch network becomes larger. When a large-capacity switch network is implemented, it is divided into unit switches manufactured with a small capacity of hardware. In addition, the method of forming the entire switch network by combining them should be considered, and the switch network must be designed to minimize the kinds of unit switches for economic efficiency and easy hardware implementation. For this purpose, the unit switches must have modularity. If the unit switches have modularity, regular arrangement of the entire switch network is enabled and its hardware implementation becomes easy. If the unit switches have no modularity, there is no unity between the unit switches, and unit switches of different structures must be used in plurality. This complicates the entire configuration of the switch network. The kind of unit switches and complexity of hardware depend on whether the unit switches have modularity or not. In order for regular arrangement of the unit switches, the shuffle of the input ports of the ATM switch network is required in stage interconnection of switch.

A method of implementing the unit switches will be described below. The ATM switch network of the present invention is formed with input network 12, copy network 32, feedback network 52, and routing network 63. For input network 12 and feedback network 52, Banyan network is used. For copy network 32, reverse Banyan network is used. For routing network 63, crossbar network is used. Here, the reverse Banyan network is made by changing the direction of input and output of the Banyan network. The Banyan network has three characteristics as follows. A single path is present between the input port and output port. Secondly, paths to all the output ports from an input port are present. Thirdly, there is no path between an output port and an input port.

When the 1,024*1,024 Banyan network or reverse Banyan network is formed as in the present invention, the volume of the unit switch must be 32*32 and two stages in order to maintain the network's properties. In the configuration of the ATM switch network of 1,024*1,024, if the 32*32 unit switch is not used (in case that it is expanded like crossbar network using 16*16 or 64*64 network), the entire switch network cannot have the characteristics of the Banyan network or reverse Banyan network. This ensures no advantages of the ATM switch network, and it is hard to control the network.

Figure 26:
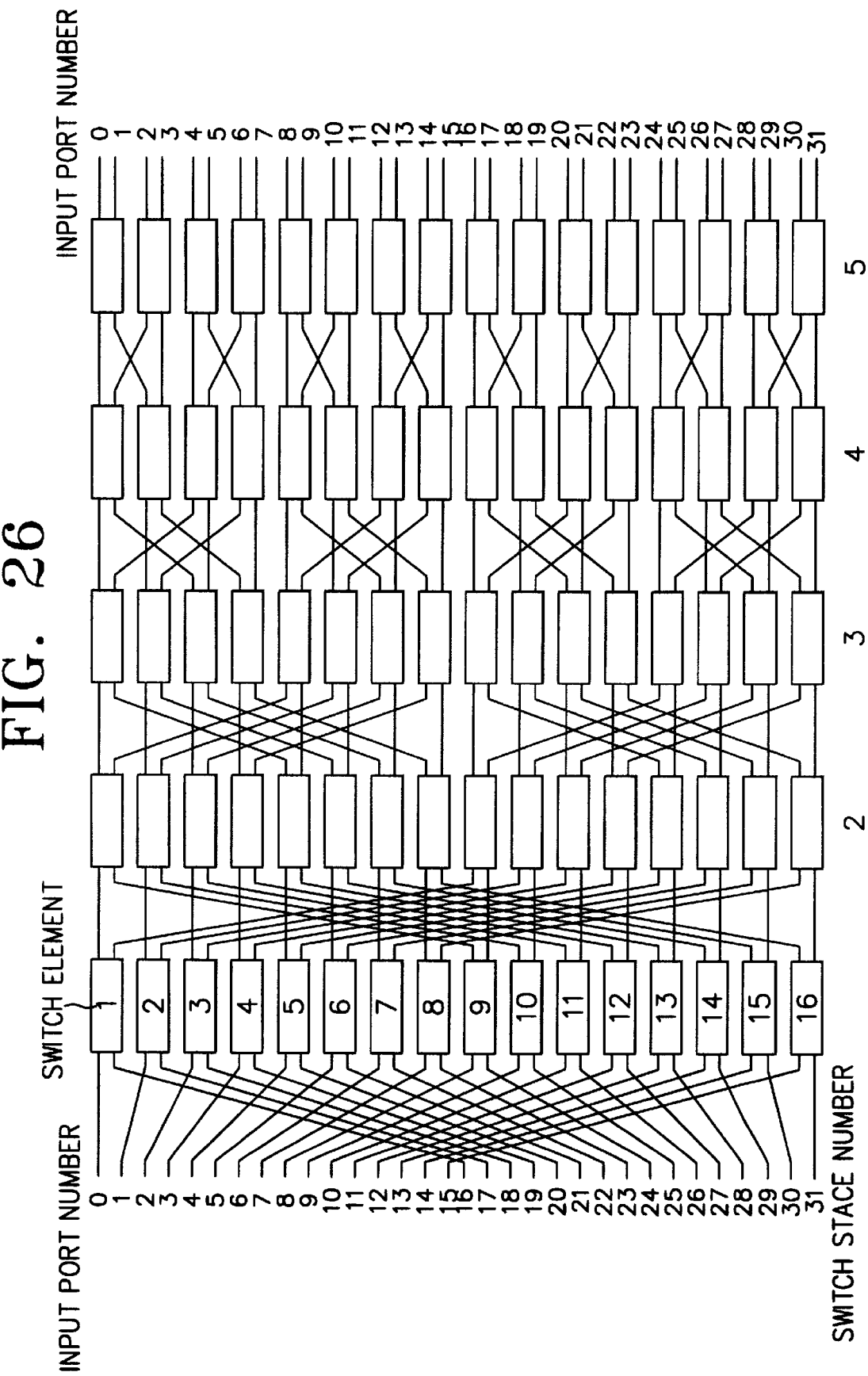
FIG. 26 illustrates the structure of the Banyan unit switches according to the present invention, taking an example of 32*32 Banyan switch.
Figure 27:
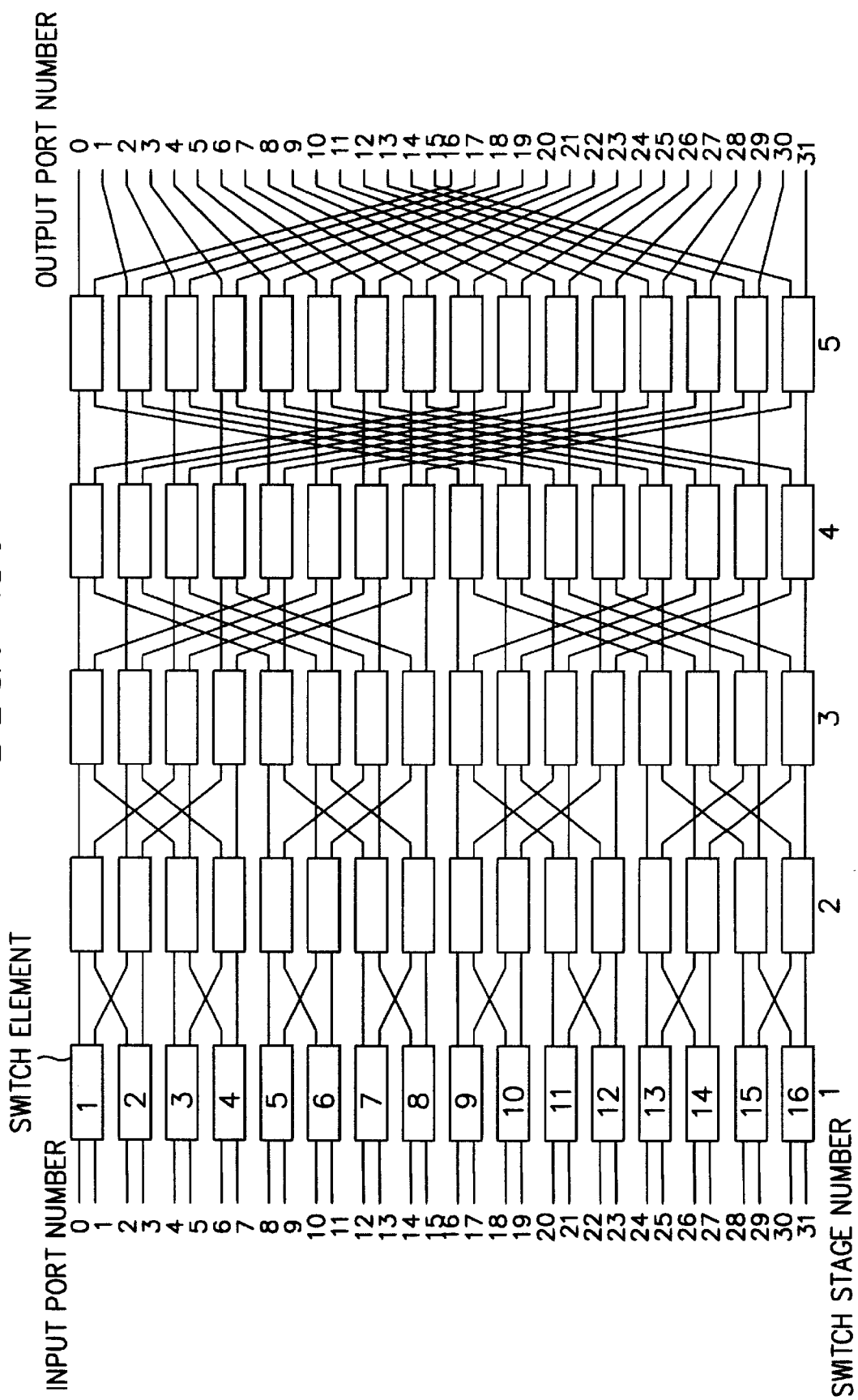
FIG. 27 illustrates the structure of the reverse Banyan unit switch according to the present invention, taking an example of 32*32 reverse Banyan switch.

The amount of hardware of the entire switch network is determined by the volume of the unit switches. In this invention, the volume of unit switch is determined to be 32*32 in consideration of the current semiconductor technology, signal processing speed of PCB, and the number of I/O pin. FIG. 26 illustrates the configuration of the Banyan network of 32*32 volume. The 32*32 Banyan network has 32 input port and output port, and is formed at five stages. Each stage is made with 16 2*2 elements. FIG. 27 illustrates the configuration of the 32*32 reverse Banyan network. The 32*32 reverse Banyan network is the same as the 32*32 Banyan network of FIG. 26 whose input port and output port are used reversely.

Figure 28:
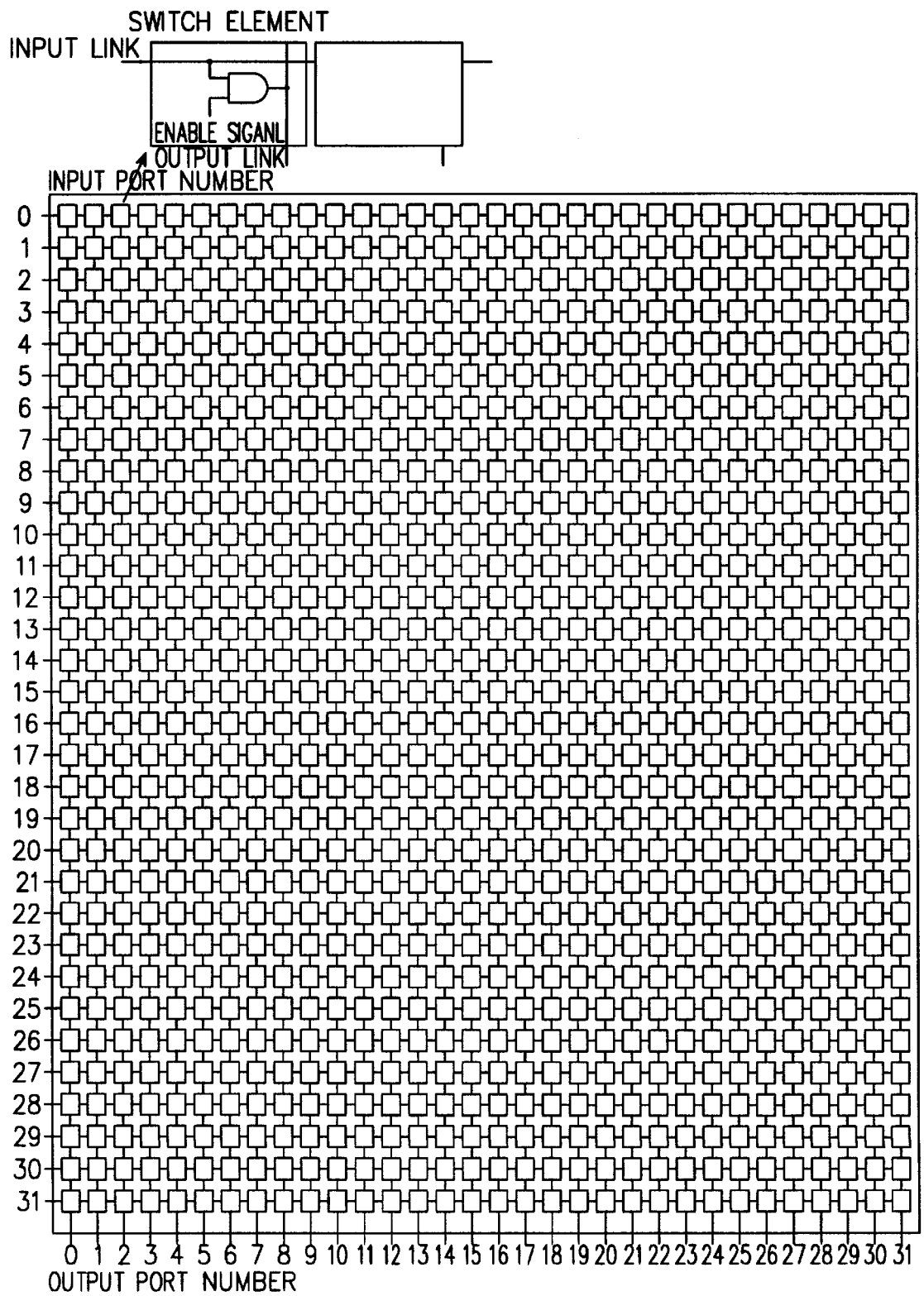
FIG. 28 illustrates the structure of the crossbar unit switch according to the present invention, taking an example of 32*32 crossbar switch.

The 32*32 crossbar network used as the unit switches of routing network 63 has the structure as in FIG. 28, and is a non-blocking switch, unlike the Banyan network or reverse Banyan network.

As described above, the ATM switch network of the present invention has the following advantages. First of all, the input buffer is shared by all the input ports so that the buffer is used efficiently. Second, the buffer overflow is prevented, and cell loss is eliminated in turn. Third, cells are not stored intensively in a specific buffer, minimizing cell transfer delay. Fourth, a high-speed cell exchange is enabled, having an excellent performance. Fifth, the input network, copy network, and feedback network can be implemented in the same structure. Finally, though the switch network is a single-path, multiple path switch networks are used to have a multipath performance, thereby eliminating difficulty in path control of multipath switch network.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for implementing an asynchronous transfer mode switch network, said apparatus comprising:

an input buffer for storing input cells;

an input switch network having a predetermined number of unit switches and having input ports and output ports connected between the input ports and the input buffer, said input switch network performing a fetch and add function in which a number of cell input is added in a direction from the input ports to the output ports and an address of the input buffer is transferred in a direction from the output ports to the input ports according to the number of cell input added, said input switch network transferring the input cells to the input buffer for storage according to a result calculated from the fetch and add function;

a routing table for storing routing information for routing the input cells;

a routing controller for receiving the input cells stored in the input buffer and for outputting and controlling the routing of the input cells in accordance with said routing information from said routing table;

routing switch networks, each having an input port, an output port and a predetermined number of switches, for switching and outputting the input cells;

a cell splitter connected to the input ports of said routing switch networks for splitting and transferring the input cells outputted by said routing controller for provision to said switches; and a cell merger connected to the output ports of said routing switch networks for merging and outputting the input cells outputted by said routing switch networks.

2. The apparatus of claim 1, said input switch network having said predetermined number of unit switches corresponding to sixty four (64) reversed Banyan unit switches with each unit switch exhibiting a volume of 32×32.

3. The apparatus of claim 1, said input switch network having said predetermined number of unit switches corresponding to sixty four (64) Banyan unit switches with each unit switch exhibiting a volume of 32×32.

4. The apparatus of claim 1, each said routing switch network having said predetermined number of unit switches corresponding to sixty four (64) cross-bar unit switches connected in parallel with each unit switch exhibiting a volume of 32×32.

5. The apparatus of claim 1, each said input cell comprising:

an area for storing a bit indicative of whether a cell is active or inactive;

an area for storing bits indicative of services of singlecast, multicast and broadcast;

an area for storing cell copy information indicative of a minimum address and a maximum address required for copying cells;

an area for storing information indicative of the number of cells to be copied;

an area for storing information for identifying the input port of the asynchronous transfer mode switch network to which the cell is input and for providing a routing tag after routing control;

an area for storing virtual path identification information;

an area for storing virtual channel identification information;

an area for storing payload type identification information;

an area for storing cell loss priority information; and an area for storing header error control information.

6. An apparatus for implementing an asynchronous transfer mode switch network, said apparatus comprising:

an input buffer for storing input cells;

an input switch network having input ports and output ports connected to said input buffer, for performing a fetch and add function in which a number of cell input is added in a direction from the input ports to the output ports and an address of the input buffer is transferred in a direction from the output ports to the input ports according to the number of cell input added, said input switch network transferring the input cells to said input buffer for storage according to a result calculated from the fetch and add function;

a copy switch network having input ports connected to said input buffer and having output ports for performing a fetch and add function in which a number of cell copy is added in a direction from the input ports to the output ports and a copy index corresponding to the number of cells copied is transferred in a direction from the output ports to the input ports, said copy switch network copying and transferring the input cells from said input buffer according to a result calculated from the fetch and add function of said copy switch network;

a routing table for storing routing information for routing the input cells;

a routing controller for receiving the input cells stored from the input buffer and for outputting and controlling the routing of the input cells in accordance with said routing information from said routing table;

routing switch networks, each having an input port and an output port for switching and outputting the input cells;

a cell splitter connected to the input ports of said routing switch networks for splitting and transferring the input cells outputted by said routing controller for provision to said routing switch networks; and a cell merger connected to the output ports of said routing switch networks for merging and outputting the input cells outputted by said routing switch networks.

7. The apparatus of claim 6, said input switch network having sixty four (64) reversed Banyan unit switches with each unit switch exhibiting a volume of 32×32.

8. The apparatus of claim 6, said input switch network having sixty four (64) Banyan unit switches with each unit switch exhibiting a volume of 32×32.

9. The apparatus of claim 6, said copy switch network having sixty four (64) reversed Banyan unit switches with each unit switch exhibiting a volume of 32×32.

10. The apparatus of claim 6, each said routing switch network having sixty four (64) cross-bar unit switches connected in parallel with each unit switch exhibiting a volume of 32×32.

11. The apparatus of claim 6, each said input cell comprising:
   an area for storing a bit indicative of whether a cell is active or inactive;
   an area for storing bits indicative of services of singlecast, multicast and broadcast;
   an area for storing cell copy information indicative of a minimum address and a maximum address required for copying cells;
   an area for storing information indicative of a number of cells to be copied;
   an area for storing information for identifying the input port of the asynchronous transfer mode switch network to which the cell is input and for providing a routing tag after routing control;
   an area for storing virtual path identification information;
   an area for storing virtual channel identification information;
   an area for storing payload type identification information;
   an area for storing cell loss priority information; and
   an area for storing header error control information.

12. An apparatus for implementing an asynchronous transfer mode switch network, said apparatus comprising:
   an input buffer for storing input cells;
   an input switch network having input ports and output ports connected to said input buffer for performing a fetch and add function in which a number of cell input is added in a direction from the input ports to the output ports and an address of the input buffer is transferred in a direction from the output ports to the input ports according to the number of cell input added, said input switch network transferring the input cells to said input buffer for storage according to a result calculated from the fetch and add function;
   a copy switch network having input ports connected to said input buffer and having outputs for performing a fetch and add function in which a number of cell copy is added in a direction from the input ports to the output ports and a copy index corresponding to the number of cells copied is transferred in a direction from the output ports to the input ports, said copy switch network copying and transferring the input cells from said input buffer according to a result calculated from the fetch and add function of said copy switch network;
   a feedback switch network having input ports connected to said copy switch network for receiving cells fed back and maintaining the fedback cells until a next cell cycle;
   a routing table for storing routing information for routing the input cells;
   a routing and feedback controller coupled to receive the input cells transferred from said copy switch network and the fedback cells from said feedback switch network for controlling the routing of the input cells and the fedback cells in accordance with the routing information in said routing table, and for feeding back cells colliding at the output ports as fedback cells to said feedback switch network;
   routing switch networks, each having an input port and an output port for switching and outputting the input cells;
   a cell splitter connected to the input ports of said routing switch networks for splitting and transferring the input cells outputted by said routing and feedback controller for provision to said routing switch networks; and
   a cell merger connected to the output ports of said routing switch networks for merging and outputting the input cells outputted by said routing switch networks.

13. The apparatus of claim 12, said input switch network having sixty four (64) reversed Banyan unit switches with each unit switch exhibiting a volume of 32×32.

14. The apparatus of claim 12, said copy switch network having sixty four (64) reversed Banyan unit switches with each unit switch exhibiting a volume of 32×32.

15. The apparatus of claim 12, said feedback switch network having sixty four (64) reversed Banyan unit switches with each unit switch exhibiting a volume of 32×32.

16. The apparatus of claim 12, each said routing switch network having sixty four (64) cross-bar unit switches connected in parallel with each unit switch exhibiting a volume of 32×32.

17. The apparatus of claim 12, each said input cell comprising:
   an area for storing a bit indicative of whether a cell is active or inactive;
   an area for storing bits indicative of services of singlecast, multicast and broadcast;
   an area for storing cell copy information indicative of a minimum address and a maximum address required for copying cells;
   an area for storing information indicative of the number of cells to be copied;
   an area for storing information for identifying the input port of the asynchronous transfer mode switch network to which the cell is input and for providing a routing tag after routing control;
   an area for storing virtual path identification information;
   an area for storing virtual channel identification information;
   an area for storing payload type identification information;
   an area for storing cell loss priority information; and
   an area for storing header error control information.

18. A cell switching method for an asynchronous transfer mode switching system, said method comprising the steps of:
   sequentially switching and storing input cells according to an input order so that overall input ports share an input buffer;
   analyzing cell headers of the cells to determine whether the input cells are copied whether to switch input cells to be copied, and whether to copy the input cells for a predetermined number;

feeding back cells colliding at an output port as fed back cells;

determining routing of the fed back cells and the input cells with reference to a routing table so as to provide routing-controlled cells;

switching and storing the fed back cells for a next cell cycle; and switching the routing-controlled cells to thereby prevent internal blocking and output port contention;

each said input cell having a cell header comprising at least one of:

an area for storing a bit indicative of whether a cell is active or inactive;

an area for storing bits indicative of services of singlecast, multicast and broadcast;

an area for storing cell copy information indicative of a minimum address and a maximum address required for copying cells;

an area for storing information indicative of a number of cells to be copied;

an area for storing information for identifying the input port of the asynchronous transfer mode switch network to which the cell is input and for providing a routing tag after routing control;

an area for storing virtual path identification information;

an area for storing virtual channel identification information;

an area for storing payload type identification information;

an area for storing cell loss priority information; and an area for storing header error control information.

19. An internal cell header structure of an asynchronous transfer mode switching system, said cell header structure comprising:

an area for storing a bit indicative of whether a cell is active or inactive;

an area for storing bits indicative of services of singlecast, multicast and broadcast;

an area for storing cell copy information indicative of a minimum address and a maximum address required for copying cells;

an area for storing information indicative of the number of cells to be copied;

an area for storing information for identifying the input port of the asynchronous transfer mode switch network to which the cell is input and for providing a routing tag after routing control;

an area for storing virtual path identification information;

an area for storing virtual channel identification information;

an area for storing payload type identification information;

an area for storing cell loss priority information; and an area for storing header error control information.

\* \* \* \* \*